US010726379B1

(12) United States Patent
Donnelly et al.

(10) Patent No.: US 10,726,379 B1
(45) Date of Patent: Jul. 28, 2020

(54) LAST MILE DELIVERY SYSTEMS AND METHODS USING A COMBINATION OF AUTONOMOUS LAUNCH AND DELIVERY VEHICLES

(71) Applicant: UATC, LLC, San Francisco, CA (US)

(72) Inventors: Richard Brian Donnelly, Pittsburgh, PA (US); James Lee Epifano, San Francisco, CA (US); Jacob William Fischer, Wexford, PA (US); Christopher Matthew D'Eramo, Bethel Park, PA (US); David Patrick Rice, Wexford, PA (US)

(73) Assignee: UATC, LLC, San Francisco, CA (US)

( * ) Notice: Subject to any disclaimer, the term of this patent is extended or adjusted under 35 U.S.C. 154(b) by 220 days.

(21) Appl. No.: 15/708,748

(22) Filed: Sep. 19, 2017

(51) Int. Cl.
*G06Q 10/08* (2012.01)
*G05D 1/00* (2006.01)
*G06Q 10/04* (2012.01)
*G05D 1/02* (2020.01)

(52) U.S. Cl.
CPC ......... *G06Q 10/083* (2013.01); *G05D 1/0088* (2013.01); *G05D 1/0291* (2013.01); *G06Q 10/04* (2013.01); *G05D 2201/0213* (2013.01)

(58) Field of Classification Search
CPC .... G06Q 10/083; G06Q 10/04; G05D 1/0088; G05D 1/0291; G05D 2201/0213; B60P 3/11; B64C 2201/128; B64C 2201/208

USPC .................................................... 701/23, 25
See application file for complete search history.

(56) References Cited

U.S. PATENT DOCUMENTS

| | | | |
|---|---|---|---|
| 9,412,280 B1 | 8/2016 | Zwillinger et al. | |
| 9,792,576 B1 * | 10/2017 | Jamjoom | G06Q 10/0832 |
| 2016/0200438 A1 * | 7/2016 | Bokeno | B64C 39/024 |
| 2017/0132562 A1 * | 5/2017 | High | G06Q 10/0833 |
| 2019/0012636 A1 * | 1/2019 | Simon | G06Q 10/0832 |
| 2019/0070995 A1 * | 3/2019 | Cantrell | B60P 3/11 |
| 2019/0220819 A1 * | 7/2019 | Banvait | B64C 39/024 |

* cited by examiner

*Primary Examiner* — Nadeem Odeh
(74) *Attorney, Agent, or Firm* — Dority & Manning, P.A.

(57) ABSTRACT

A launch vehicle can include a mobility system, a launch system, and a computing system. The mobility system can be configured to travel to a general target location. The launch system can be configured to house a plurality of autonomous delivery vehicles assigned for transporting one or more deliverable items from the general target location to respective specific target delivery locations. The computing system can be configured to control launch of the plurality of autonomous delivery vehicles from the launch vehicle at a respective plurality of predetermined launch positions, each predetermined launch position associated with a corresponding launch time, and each autonomous delivery vehicle configured to travel from a launch position of the respective plurality of predetermined launch positions to a specific target delivery location of the respective specific target delivery locations and from the specific target delivery location to one or more predetermined landing positions.

15 Claims, 13 Drawing Sheets

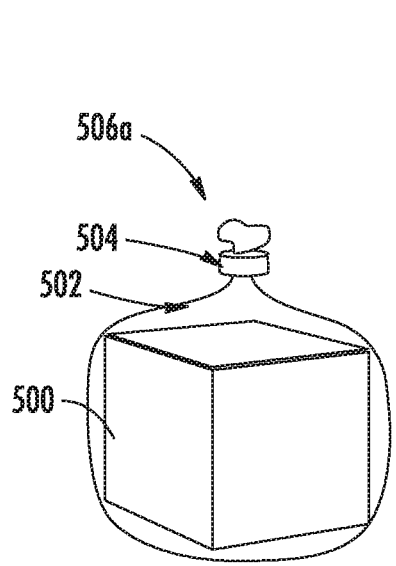
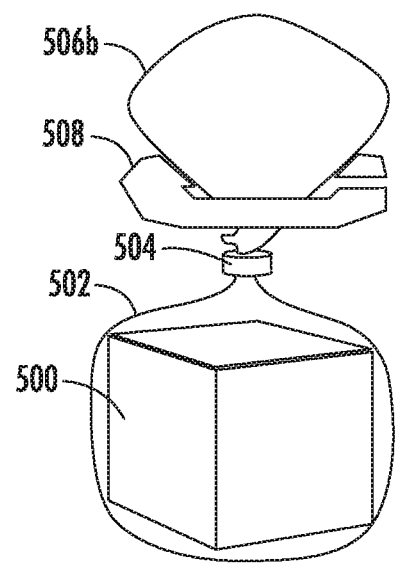
FIG. 5A  FIG. 5B
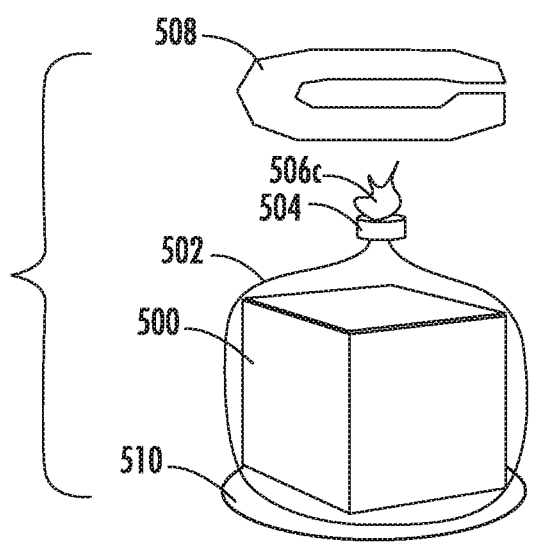
FIG. 5C

LAST MILE DELIVERY SYSTEMS AND METHODS USING A COMBINATION OF AUTONOMOUS LAUNCH AND DELIVERY VEHICLES

FIELD

The present disclosure relates generally to systems and methods of transporting deliverable items. More particularly, the present disclosure relates to autonomous vehicle delivery coordinated within the last mile (e.g., across general and specific target locations associated with a plurality of end recipients).

BACKGROUND

Conventional human-operated delivery vehicles have usefulness in a variety of applications. For example, postal service entities and/or global courier delivery service entities employ vehicles to deliver mail, packages, and related deliverable items. Taxicab services, rideshare services, and the like are used to transport passengers from one location to another. More focused entity-operated delivery services can provide item-specific delivery of food, flowers, medications, perishable goods, non-perishable goods, etc.

Autonomous vehicles are currently being considered for services such as passenger transport. An autonomous vehicle is a vehicle that is capable of sensing its environment and navigating with little to no human input. Given knowledge of its surrounding environment, the autonomous vehicle can identify an appropriate motion path to a destination location. Further development of autonomous vehicles is desired to extend their opportunity to other applications including transport of a variety of deliverable items in a manner that reduces delivery time, cost and congestion.

SUMMARY

Aspects and advantages of embodiments of the present disclosure will be set forth in part in the following description, or can be learned from the description, or can be learned through practice of the embodiments.

One example aspect of the present disclosure is directed to an autonomous delivery vehicle including a main body, a communication system, a positioning sensor and a sensor system. The main body is configured to provide support for transporting a deliverable item, the deliverable item having an encoded datasource associated therewith that contains information describing a specific target delivery location. The communication system is configured to gather information provided by the encoded datasource such that motion of the autonomous delivery vehicle can be controlled for travel between a general target location associated with an autonomous launch vehicle and the specific target delivery location associated with the deliverable item. The autonomous launch vehicle is configured to travel to the general target location before launching the autonomous delivery vehicle for travel to the specific target delivery location. The positioning sensor is configured to determine a specific location of the autonomous delivery vehicle relative to the specific target delivery location. The sensor system includes one or more sensors configured to obtain sensor data descriptive of an environment proximate to the autonomous delivery vehicle and identify the specific target delivery location for delivering the deliverable item.

Another example aspect of the present disclosure is directed to a launch system for autonomous delivery vehicles including a first rail, a second rail, and an inflation system. The first rail is configured to receive a plurality of autonomous delivery vehicles. The second rail is configured to receive a plurality of deliverable items respectively enclosed by a portion of packaging material, each distinct portion of packaging material configured for pairing with an autonomous delivery vehicle for transporting one or more of the plurality of deliverable items to a target location. The inflation system is positioned relative to a launch opening of the launch system, the inflation system configured to pump one or more gases into an inflatable device associated with each portion of packaging material.

Another example aspect of the present disclosure is directed to a launch vehicle including a mobility system, a launch system, and a computing system. The mobility system is configured to travel to a general target location. The launch system is configured to house a plurality of autonomous delivery vehicles, each autonomous delivery vehicle assigned for transporting one or more deliverable items from the general target location to respective specific target delivery locations. The computing system is configured to control the launch of one or more autonomous delivery vehicles from the launch vehicle at one or more predetermined launch positions associated with the general target location and corresponding launch times.

Another example aspect of the present disclosure is directed to a computer-implemented method of determining launch positions for a plurality of autonomous delivery vehicles. The method includes receiving, by a computing system comprising one or more computing devices, a plurality of target delivery locations for a plurality of respective deliverable items. The method also includes calculating, by the computing system, one or more different potential launch positions for each target delivery location. The method also includes determining, by the computing system, a selected launch position from the one or more different potential launch positions for pairing with each target delivery location. The method also includes generating, by the computing system, a launch path for launching a plurality of autonomous delivery vehicles, each autonomous delivery vehicle coupled with one or more respective deliverable items, wherein the launch path includes each selected launch position paired with a target delivery location. The method also includes providing, by the computing system, an output related to the launch path to an autonomous launch vehicle that carries the plurality of autonomous delivery vehicles.

Another example aspect of the present disclosure is directed to one or more non-transitory computer-readable media storing computer-readable instructions that when executed by one or more processors cause the one or more processors to perform operations. The operations include obtaining an image that depicts a visual marker that marks a target delivery location associated with a designated end recipient. The operations also include creating a localized target pattern for the target delivery location based at least in part on the image. The operations also include associating the target delivery location with one or more geographic identifiers. The operations also include storing the localized target pattern and the one or more geographic identifiers associated with the target delivery location in a delivery database. The one or more geographic identifiers are configured to guide an autonomous delivery vehicle to a general vicinity of the target delivery location, and the localized target pattern is configured to guide the autonomous delivery vehicle to a specific vicinity of the target delivery location where the autonomous delivery vehicle can deliver the deliverable items identified in the delivery database.

Other aspects of the present disclosure are directed to various methods, systems, apparatuses, vehicles, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 5A-5C respectively depict packaging material and a deliverable item coupled to an autonomous delivery vehicle according to example embodiments of the present disclosure;

DETAILED DESCRIPTION

Figure 1:
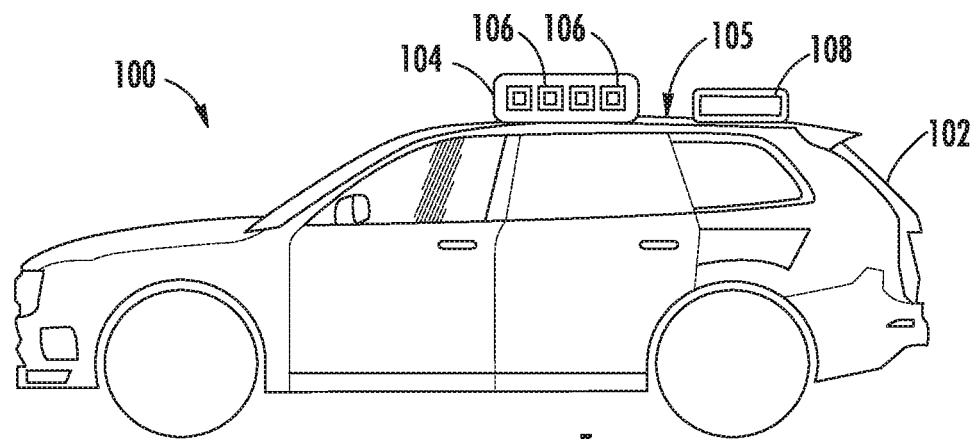
FIG. 1 depicts an example launch vehicle and launch system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to delivery systems and methods using a combination of autonomous launch and delivery vehicles. In particular, in some embodiments of the present disclosure, an autonomous launch vehicle can be configured to transport deliverable items (e.g., perishables, non-perishables, mail packages, people, animals, other objects) from an interim location (e.g., a distribution center, transportation center) to a general target location associated with one or more end recipients. The autonomous launch vehicle (e.g., a land-based vehicle) can also be configured to transport a plurality of autonomous delivery vehicles (ADVs) which can be launched from the autonomous launch vehicle (ALV) to transport the deliverable items the remaining distance from the general target location to respective specific target delivery locations associated with each end recipient. In some embodiments, the ADVs are autonomous airborne vehicles, although other options (e.g., land-based vehicles, water-based vehicles, etc.) can be used in other implementations. An interactive recipient delivery application can be utilized by end recipients to identify specific target delivery locations for delivery (e.g., package delivery) and to track delivery (e.g., package delivery). A computing system can generate delivery localization data based on target location information provided via the interactive recipient delivery application. Features are also provided for determining launch/travel paths and controlling operation of the autonomous launch vehicles and/or autonomous delivery vehicles. By providing technology for implementing autonomous vehicle delivery coordinated within the last mile (e.g., across general and specific target locations associated with a plurality of end recipients), automated delivery systems and methods can advantageously achieve substantial cost savings and efficiency improvements for numerous applications including package delivery, food delivery, human transport and the like.

In accordance with one aspect of the present disclosure, an autonomous launch vehicle can provide transportation for a plurality of deliverable items from a distribution center to one or more general target locations. From each general target location, the autonomous launch vehicle can travel in accordance with a launch path and launch a plurality of autonomous delivery vehicles from the autonomous launch vehicle to travel to specific target delivery locations associated with respective end recipients for the deliverable items. The autonomous launch vehicle can correspond, for example, to a land-based vehicle (e.g., a car, a truck, a motorbike, etc.), an air-based vehicle (e.g., a drone, helicopter, airplane, etc.) and/or a water-based vehicle (e.g., a boat, submergible watercraft, etc.)

More particularly, in some embodiments, an autonomous launch vehicle can include various systems and devices configured to control the operation of the autonomous launch vehicle. For example, the autonomous launch vehicle can include a mobility system for travel to a general target location. In some implementations, the general target location can correspond to a single predetermined position to which the autonomous launch vehicle can travel to and remain stationary. In some implementations, the general target location includes a predetermined launch path along which the autonomous launch vehicle can travel for one or more consecutive iterations. When the autonomous launch vehicle comprises a land-based vehicle, the general target location can include a predetermined launch path along with the autonomous launch vehicle can travel in-lane with other land-based traffic in a geographic area.

In addition, an autonomous launch vehicle can include an onboard vehicle computing system for operating the vehicle (e.g., located on or within the autonomous launch vehicle). The vehicle computing system can receive sensor data from sensor(s) onboard the autonomous launch vehicle (e.g., one or more cameras (e.g., mono cameras, infrared cameras, stereo cameras, etc.), Light Detection and Ranging (LIDAR) systems, and/or Range Detection and Ranging (RADAR) systems), attempt to comprehend the launch vehicle's surrounding environment by performing various processing techniques on the sensor data, and generate an appropriate motion plan through the launch vehicle's surrounding environment. As such, the vehicle computing system can include an autonomy system for perceiving objects in the surrounding environment, predicting future locations and paths associated with such objects, generating a motion plan that navigates through the surrounding environment based on map data as well as the predicted location of surrounding objects, and outputs vehicle control signals to control motion of the autonomous launch vehicle in accordance with the motion plan. In some implementations, a motion plan for the autonomous vehicle is further generated in accordance with a launch path for launching a plurality of autonomous delivery vehicles as discussed herein.

Still further, the autonomous launch vehicle can include one or more communication systems such that the autonomous launch vehicle is configured to communicate with one or more computing devices that are remote from the launch vehicle. For example, the autonomous launch vehicle can wirelessly communicate with an operations computing system that can be associated with an entity for providing a delivery service. The operations computing system can help the entity monitor, communicate with, manage, etc. the fleet of launch vehicles, delivery vehicles, deliverable items, and the like. The communication system of the autonomous launch vehicle can also facilitate the autonomous launch vehicle to wirelessly communicate with a plurality of autonomous delivery vehicles configured to launch from the autonomous launch vehicle and deliver respective deliverable items to one or more target locations associated with one or more end recipients. When the communication system of the autonomous launch vehicle is used to communicate with one or more autonomous delivery vehicles, the communication system can be configured to maintain wireless communication with each autonomous delivery vehicle after the autonomous delivery vehicle launches from the launch vehicle for travel to a specific target delivery location and return from the specific target delivery location to the launch vehicle. The communication system of the autonomous launch vehicle can also be used for package tracking either by communicating with autonomous delivery vehicles during delivery travel and/or directly with RFID components or other tracking devices associated with the deliverable item(s) transported on each autonomous delivery vehicle.

Still further, the autonomous launch vehicle can include a launch system attached to or otherwise positioned relative to a surface (e.g., an upper surface such as a roof or a lower surface such as an underside) of the launch vehicle. The launch system can be configured to house a plurality of autonomous delivery vehicles, each autonomous delivery vehicle assigned for transporting one or more deliverable items from the general target location to respective specific target delivery locations. Launch of the one or more autonomous delivery locations from the autonomous launch vehicle at one or more predetermined launch positions and corresponding launch times can be controlled by a dedicated controller within the launch system or by the vehicle computing system associated with the autonomous launch vehicle. The one or more predetermined launch positions can be defined relative to or otherwise associated with the general target location. For example, when the general target location is a single predetermined position, the one or more predetermined launch positions can correspond to the single predetermined position. When the general target location is a launch path that the launch vehicle is configured to navigate, the one or more predetermined launch positions can correspond to one or more different positions along the launch path.

In some embodiments, a launch system included within or otherwise associated with an autonomous launch vehicle can more particularly include a first rail and a second rail. The first rail can be configured to receive a plurality of autonomous delivery vehicles, for example, by positioning the first rail within C-shaped grooves, holes or other openings defined by the shape of the autonomous delivery vehicles. In some implementations, the first rail can be a positioning structure as well as a charging rail configured to transfer electric power (e.g., conductive charging, inductive charging, electromagnetic charging, etc.) to a battery or other power source within the plurality of autonomous delivery vehicles. A supplemental and/or alternative power transfer system can include features for swapping batteries or implementing chemical energy transfer (e.g., pumping of fresh electrolyte or other suitable material into a fuel cell or liquid battery provided within the autonomous delivery vehicle(s)). The second rail can be configured to receive a plurality of deliverable items respectively enclosed by a portion of packaging material. Each distinct portion of packaging material can be paired with an autonomous delivery vehicle for transporting one or more of the plurality of deliverable items to a target location. The second rail can be configured as a package conveyer machine along with the portions of packaging material and associated deliverable items can be moved for successive pairing with an autonomous delivery vehicle.

More particularly, in some implementations, packaging material associated with one or more deliverable items can correspond to a disposable packaging tether (e.g., a net or other flexible material) that can be attached to or integral with packaging of the deliverable items). For instance, packaging material such as a net can be designed to hold one or more packages and/or one or more letters all going to the same target delivery location (e.g., an address associated with one or more end recipients). Each portion of packaging material can be formed to include a surface opening and void in which an expandable device (e.g., an inflatable device) can temporarily secure the package for delivery.

In some implementations, the launch system can include an inflation system positioned relative to a launch opening of the launch system. The inflation system can be configured to pump one or more gases (e.g., air, helium or other suitable gas) into a plurality of inflatable bladders (e.g., inflatable balloons or the like) associated with each portion of packaging material. In some implementations, an end of the first rail can be positioned towards an end of the second rail at the launch opening such that an inflatable device can be pumped with air and coupled with a corresponding deliverable item enclosed in packaging material and a corresponding autonomous delivery vehicle. When portions of packaging material are associated with expandable devices that can expand without sole use of inflatable gases, then the launch system can include an expansion system configured to implement expansion of the expandable devices. Expandable devices can be expanded, for example, using non-gas substances such as liquids or solids or rigid or semi-rigid frames coupled to the interior and/or exterior of a portion of packaging material as an alternative to or in addition to inflatable gases.

In some implementations, the launch system can further include a launch spike. A launch spike can be coupled to a first end of the first rail proximate to the inflation system and launch opening from which the plurality of autonomous delivery vehicles are aerially launched. As each distinct portion of packaging material and enclosed deliverable item(s) controllably moves along the second rail towards the launch opening, a tether containing an encoded datasource (e.g., an RFID device such as an NFC chip or the like, a machine-readable symbol such as a barcode, QR code or the like) can be caught up in the torus shape lifting the package. The mobility system associated with the autonomous delivery location determines information describing a target delivery location from the encoded datasource and is controlled to travel to the target delivery location. When an autonomous delivery vehicle reaches a target delivery location, it can lower itself with the deliverable item(s) to the target, then can pop the inflatable device releasing the package on the target.

In some implementations, the launch system can further include a landing spike. Upon returning to an autonomous launch vehicle after transporting the deliverable item(s), the autonomous delivery vehicle can be controlled to maneuver for landing on the landing spike. In some implementations, the landing spike is coupled to a second end of the first rail such that the autonomous delivery vehicle can slide down the landing spike and onto the first rail for charging, reloading with one or more next deliverable items and subsequent launch to a new target location. A position marker (e.g., a wireless beacon, a visual symbol) can be included within the launch system or other portion of an autonomous launch vehicle for guiding the plurality of autonomous delivery vehicles to return for landing at the landing spike or other location. The launch system or other portion of an autonomous launch vehicle can also include a package receptacle configured to receive deliverable items that were unable to be successfully delivered to a target delivery location.

A launch spike and/or landing spike, when provided, can advantageously help to provide secure positional features within the launch system such that autonomous delivery vehicles can more safely launch and/or land during a variety of weather conditions, operational conditions, and the like. More particularly, launch spikes and/or landing spikes can provide lateral stability for aerial launch and/or landing while under influence from forces on the delivery vehicle such as cross winds, launch vehicle acceleration or lateral G-Forces. Such spike(s) can help prevent an autonomous delivery vehicle from colliding with the sides of launch and/or landing openings or other parts of a launch vehicle.

Although the embodiments herein describe a launch system positioned within or otherwise associated with an autonomous launch vehicle, it should be appreciated that the described launch systems can additionally or alternatively be provided on other structures such as other vehicles (e.g., non-autonomous vehicles such as automobiles, trucks, buses, trains, boats, aerial vehicles) or on surfaces of warehouses or other buildings, parking locations, roofs or other suitable locations. Autonomous delivery vehicles can be launched from coordinated and distributed network of multiple launch systems regardless of the static and/or dynamic location of each launch system.

In accordance with another aspect of the present disclosure, a plurality of autonomous delivery vehicles can be provided at an autonomous launch vehicle. Each autonomous delivery vehicle can correspond, for example, to a land-based vehicle (e.g., a car, a truck, a motorbike, etc.), an air-based vehicle (e.g., a drone, helicopter, airplane, hovercraft, etc.) and/or a water-based vehicle (e.g., a boat, submergible watercraft, etc.) In some implementations, each autonomous delivery vehicle is generally smaller in size than the autonomous launch vehicle. In particular implementations, an autonomous launch vehicle is a land-based vehicle and the plurality of autonomous delivery vehicles are air-based vehicles (e.g., remote-piloted or autonomously navigating drones) and/or land-based vehicles that are smaller in size than the land-based autonomous launch vehicle. Although such autonomous delivery vehicles are described herein as being launched from an autonomous launch vehicle, it should be appreciated that such autonomous delivery vehicles can alternatively be used with a launch vehicle that is not autonomous, but that is instead manually operated and controlled to a general target location before launching associated autonomous delivery vehicles.

Each autonomous delivery vehicle can provide transportation for one or more deliverable items from an autonomous launch vehicle to a specific target delivery location associated with a respective end recipient for one or more deliverable items. The autonomous delivery vehicle can be controlled to travel in accordance with a travel path from the autonomous launch vehicle to the specific target delivery location and from the specific target delivery location back to the autonomous launch vehicle. As such, each autonomous delivery vehicle can include one or more positioning sensors (e.g., GPS) for determining a specific location of the autonomous delivery vehicle relative to the specific target delivery location, a launch vehicle, and the like.

In some implementations, each autonomous delivery vehicle can further include a communication system for gathering information provided by an encoded datasource associated with each deliverable item. Each encoded datasource can contain information describing a target delivery location. For example, the encoded datasource can contain information corresponding to one or more geographic identifiers (e.g., GPS coordinates, street address, or other suitable identifiers) and/or localized target patterns or other localization data associated with a target delivery location. In some embodiments, the encoded datasource corresponds to a barcode, QR code or other machine-readable symbol associated with the deliverable item(s). In some embodiments, the encoded datasource corresponds to a radio-frequency identification (RFID) device such as a near-field communication (NFC) chip or other passive device tag configured for wireless communication with a computing system associated with the autonomous delivery vehicle. In some embodiments, localized target patterns can include a unique pattern of high contrast edges and spacing of various structural components (walls, doors, windows, etc.) around a target delivery location.

More particularly, in some embodiments, an autonomous delivery vehicle can include various systems and devices configured to control the operation of the autonomous delivery vehicle. For example, the autonomous launch vehicle can include a mobility system for travel to a specific target delivery location. In some implementations, the specific target delivery location can correspond to a particular set of GPS coordinates, a street address, a model or other dataset associated with delivery localization data (e.g., a three-dimensional model generated from an image or other delivery localization data based on target location information provided via an interactive recipient delivery application). When the autonomous delivery vehicle comprises an aerial vehicle, the travel path to a specific target delivery location can be planned to comply with flight regulations in a given local area and to avoid potential in-flight obstacles (e.g., buildings, structures, landmarks, power lines, trees, etc.)

When the autonomous delivery vehicle comprises an aerial vehicle, the autonomous delivery vehicle can include a bi-directional rotor assembly configured to provide either positive or negative thrust. For instance, the mobility system of the autonomous delivery vehicle can include a plurality of pairs of counter-rotational rotors, wherein each pair includes one rotor configured for rotation in a first direction and one rotor configured for rotation in a second direction (e.g., the second direction being generally opposite the first direction). To achieve stable hovering flight for the aerial vehicle, a level of thrust can be equalized through all rotors. To achieve directional flight, thrust is increased within one or more particular rotors to achieve movement in a desired direction. A mobility system associated with an aerial delivery vehicle can further include a gyro-stabilization system to facilitate consistent operation in a neutral hovering position when needed. A mobility system associated with an aerial delivery vehicle can further include a GPS or other positioning system to help identify and track very accurate navigational courses (e.g., a travel path determined for a specific target delivery location).

In some implementations, an aerial autonomous delivery vehicle can be configured for bi-directional flight such that the delivery vehicle can operate in either a first position wherein a top surface of the main body travels in an upward position or a second position wherein a top surface of the main body travels in a downward position. In order to achieve such bi-directional flight, an aerial autonomous delivery vehicle can include bi-directional motor(s) and bi-directional prop(s), rotatable props, and/or variable pitch blades within a given rotor assembly.

In addition, an autonomous delivery vehicle can include an onboard vehicle computing system for operating the vehicle (e.g., located on or within the autonomous delivery vehicle). The vehicle computing system can receive sensor data from sensor(s) onboard the autonomous delivery vehicle (e.g., one or more cameras (e.g., mono cameras, infrared cameras, stereo cameras, etc.) Light Detection and Ranging (LIDAR) systems and/or Range Detection and Ranging (RADAR) systems, attempt to comprehend the delivery vehicle's surrounding environment by performing various processing techniques on the sensor data, and generate an appropriate motion plan through the delivery vehicle's surrounding environment. As such, the vehicle computing system can include an autonomy system for perceiving objects in the surrounding environment, predicting future locations and paths associated with such objects, generating a motion plan that navigates through the surrounding environment based on map data as well as the predicted location of surrounding objects, and outputs vehicle control signals to control motion of the autonomous delivery vehicle in accordance with the motion plan. In addition, one or more of the sensors included within or otherwise associated with an autonomous delivery vehicle can be configured to obtain sensor data descriptive of the environment proximate to the autonomous delivery vehicle and identify one or more target delivery locations for delivering one or more deliverable items from such sensor data. For instance, images, LIDAR point clouds, RADAR data, and/or SONAR data can be obtained from the sensor(s) and compared in real-time or near real-time to stored localized target patterns, images, and/or other data to identify one or more target delivery locations.

Still further, the autonomous delivery vehicle can include one or more communication systems such that the autonomous delivery vehicle is configured to communicate with one or more computing devices that are remote from the delivery vehicle. For example, each autonomous delivery vehicle can wirelessly communicate with an operations computing system that can be associated with an entity for providing a delivery service. The communication system of each autonomous delivery vehicle can also facilitate such autonomous delivery vehicle to wirelessly communicate with the launch vehicle from which the autonomous delivery vehicle is configured to launch and/or land after travel to/from one or more target locations associated with one or more end recipients. When the communication system of each autonomous delivery vehicle is used to communicate with one or more autonomous launch vehicles, the communication system can be configured to maintain wireless communication with the autonomous launch vehicle after the autonomous delivery vehicle launches from the launch vehicle for travel to a specific target delivery location and return from the specific target delivery location to a location associated with the launch vehicle.

Still further, in some implementations the autonomous delivery vehicle can include a main body configured to provide support for transporting a deliverable item. In some implementations, the autonomous delivery vehicle can be characterized as having a generally toroidal shape. In some implementations, the autonomous delivery vehicle can be characterized as a generally C-shaped disc. When the shape of the main body of each autonomous delivery vehicle is formed with a C-shaped groove, hole or other opening, such opening(s) can be configured to be positioned relative to a rail (e.g., a first rail, a charging rail) and/or spike (e.g., a launching spike, a landing spike, etc.) associated with a launch system of an autonomous launch vehicle. Such opening(s) can also be configured to receive a tether for coupling a portion of packaging material (e.g., a flexible material such as a net, bag or the like) wrapped around and enclosing one or more deliverable items to the autonomous delivery vehicle. In some embodiments, the tether can be or otherwise include an inflatable device (e.g., an inflatable bladder, inflatable balloon, etc.). The inflatable device can be inflated before the autonomous delivery vehicle is launched for travel to a target delivery location to provide lift support for the deliverable item(s). In some implementations, for instance when the inflatable device is positioned above the main body of the autonomous delivery vehicle, the packaging material and deliverable item(s) provided therein can be supported below the main body of the autonomous delivery vehicle such that upward lift provided by the inflatable device generally opposes a gravitational pull exerted on the autonomous delivery vehicle due to the deliverable item and packaging material.

In some implementations, each autonomous delivery vehicle can include a coupling device configured to secure and release the inflatable device. In some implementations, the coupling device can include the inflatable device (e.g., an inflatable bladder) that can expand after entering an opening in a packaging material and later deflate to drop one or more deliverable items at a target location. In some implementations, the coupling device can include a permanent magnet attached to an electromagnet (e.g., a metallic disk) for magnetic coupling of a packaging material to an inflatable device. The electromagnet attached to the permanent magnet can be caused to have a reversed magnetic field just long enough to release the packaging material and deliverable item for drop at a target location. In other implementations, the coupling device can include an actuating ring that can secure and release the tether. For example, the tether can include multiple legs with rings on each leg, the legs being detachable from the rings for delivery. The ring configuration can accommodate a symmetrical geometry that will always have one ring facing skyward.

In some implementations, each autonomous delivery vehicle can include a deflation device for subjecting an inflated inflation device when inflated to an electrostatic, thermal, and/or mechanical force causing an inflated device to pop and deflate. A deflation device can include a surface piercing mechanism configured to break the membrane of the inflated device. For example, an autonomous delivery vehicle can include an actuating pin or spike that pops the inflation device to release a package. In another example, an autonomous delivery vehicle can include a thin electric heating element (e.g., an electrical arch or spark) that is turned on to melt the inflatable bladder in a manner similar to popping a balloon. In another example, an autonomous delivery vehicle can include a pressurized outlet configured to generate a stream of fluid, gas, or other suitable substance to break the membrane of an inflated device.

According to another aspect of the present disclosure, systems, methods and computer-readable medium can be configured to determine launch positions for a plurality of autonomous delivery vehicles. For example, a computing system including one or more computing devices can receive a plurality of target delivery locations for a plurality of respective deliverable items. The computing system can calculate one or more different potential launch positions for each target delivery location. More particularly, in some implementations, a computing system can determine mapping and localization data associated with a general geographic region including the plurality of target delivery locations. Additionally or alternatively, a computing system can determine historic traffic data and/or current traffic data associated with a general geographic region including the plurality of target delivery locations. Such mapping and localization data and/or historic traffic data and/or current traffic data can be used at least in part for calculating the one or more different potential launch positions for each target delivery location.

Still further, a computing system can determine a selected launch position from the one or more different potential launch positions for pairing with each target delivery location. The computing system can generate a launch path for launching a plurality of autonomous delivery vehicles, each autonomous delivery vehicle coupled with one or more respective deliverable items. The launch path can include the selected launch positions paired with each target delivery location. In some implementations, the launch path can further include a launch time associated with each selected launch position for launching the plurality of autonomous delivery vehicles. In some implementations, the launch path is configured for traversal by an autonomous launch vehicle that travels the launch path for one or more consecutive iterations while launching the plurality of autonomous delivery vehicles. In some implementations, the launch path is configured for traversal by the autonomous launch vehicle until the plurality of autonomous delivery vehicles returns to the autonomous launch vehicle after transporting the respective deliverable items to their corresponding target delivery locations.

Still further, the computing system can provide an output related to the launch path for use by an autonomous delivery application. For example, a computing system can provide an ordered list of deliverable items for loading onto the autonomous launch vehicle, the ordered list determined based on the launch path. Additionally or alternatively, a computing system can output a determined launch path for the autonomous launch vehicle including launch positions and launch times for launching the plurality of autonomous delivery vehicles while the autonomous launch vehicle traverses the launch path.

Still further steps associated with a method of determining launch positions for a plurality of autonomous delivery vehicles can include various applications of the output related to the launch path for use by an autonomous delivery application. For example, an autonomous delivery application can control loading of the plurality of deliverable items configured for delivery within the autonomous launch vehicle in a positional order that is based on the ordered list. Additionally or alternatively, an autonomous delivery application can control motion of the autonomous launch vehicle to travel in accordance with the launch path. Additionally or alternatively, an autonomous delivery application can control launch of the plurality of autonomous delivery vehicles from the autonomous delivery vehicle based at least in part on the launch positions and launch times, as well as control motion of the autonomous delivery vehicles away from and back to a corresponding launch vehicle.

According to another aspect of the present disclosure, systems, methods and computer-readable medium can be configured to implement a recipient delivery application, for example, for execution on a user computing device associated with one or more end recipients. In some implementations, a computing system including one or more computing devices can provide for display a target selection user interface. The target selection user interface can allow a recipient to interact with a three-dimensional (3D) representation (e.g., a 3D model) or a two-dimensional (2D) representation (e.g., an image such as a street view image, panoramic image, etc.) of a geographic structure of an area to mark within the 3D or 2D representation a target delivery location for deliverable items to the recipient. For example, a marked location can correspond to a general area such as a particular side of a building, a door associated with a building, a ground surface near a building or other area, etc.

In other implementations, a computing system can obtain an image that depicts a visual marker that marks a target delivery location associated with a designated end recipient (e.g., one or more individuals, a business, etc.). For example, the computing system can provide instructions for printing a target symbol, wherein the visual marker depicted in the obtained image comprises the target symbol printed and placed at the target delivery location. In some implementations, obtaining an image within a recipient delivery application can more particularly include providing for display on a display device associated with a user computing device a view as currently seen from an image sensor associated with the user computing device. A visual indication (e.g., a specific graphic, a colored symbol such as green crosshairs) overlaid on the view can be provided when the view includes the visual marker in a predetermined alignment. For instance, such visual indication can be provided when the entirety of the visual marker is included within the image. Alternatively, such visual indication can be provided when a predetermined amount of an associated structure surrounding the visual marker is included within the image. Alternatively, such visual indication can be provided when the visual marker is positioned in an accessible location for an autonomous delivery vehicle and/or in a location that includes a predetermined amount of overhead clearance (e.g., 1.5 m) for covering the target delivery location. In some implementations, a computing device executing a recipient delivery application can provide instructions for display on a display device indicating that an image has successfully been captured.

In some implementations, a recipient delivery application can include one or more target pattern creation features. For example, a computing device executing the recipient delivery application can create a localized target pattern (e.g., a two-dimensional pattern, a three-dimensional pattern) for the target delivery location based at least in part on the image. In some implementations, a localized target pattern can include a unique pattern of high contrast edges and spacing of various structural components (walls, doors, windows, etc.) around a target delivery location. For example, a three-dimensional representation can correspond to a three-dimensional model generated from the image or other delivery localization data. More particularly, the localized target pattern can be configured to guide the autonomous delivery vehicle to a specific vicinity of the target delivery location where the autonomous delivery vehicle can deliver the deliverable items identified in the delivery database. The localized target pattern can be configured to guide the autonomous delivery vehicle to a specific vicinity of the target delivery location by analyzing sensor data from sensors (e.g., camera, RADAR, LIDAR, etc.) associated with the autonomous delivery vehicle and determining when such sensor data matches a unique pattern of edges and spacing of structural components around the target delivery location as identified within the localized target pattern. Such sensor data can provide two-dimensional and/or three-dimensional descriptions of the surrounding environment of an autonomous delivery vehicle which can be compared to data within the localized target pattern.

In some implementations, a computing system can associate the target delivery location with one or more geographic identifiers (e.g., GPS coordinates, street address, and/or other suitable identifiers). The computing system can store the localized target pattern and the one or more geographic identifiers associated with the target delivery location in a delivery database. The delivery database can include a plurality of end recipient profiles including an end recipient profile associated with the designated end recipient. The one or more geographic identifiers can be configured to guide an autonomous delivery vehicle to a general vicinity of a target delivery location. The localized target pattern can then be configured to guide the autonomous delivery vehicle with more precision to a specific vicinity of the target delivery location. Once sensor data obtained by the autonomous delivery vehicle identifies a matching area in the surrounding environment (e.g., an area that matches the localized target pattern), the autonomous delivery vehicle can be controlled to travel to and deliver the deliverable item(s) to the stored specific target delivery location associated with the end recipient profile.

In some implementations, a recipient delivery application can include one or more target adjustment features. For example, a computing device executing the recipient delivery application can also receive a request to adjust the target delivery location in a delivery database. In response to receiving the request to adjust the target delivery location, the computing device can provide a user interface for display that includes an adjustable visual marker associated with the target delivery location. The computing device can receive an adjusted target delivery location via the user interface, and store the adjusted target delivery location and associated localized target pattern in the delivery database.

In some implementations, a recipient delivery application can include one or more confirmation report features. For example, a computing device executing the recipient delivery application can also receive (e.g., via an SMS message, email message, phone service message, etc.) a confirmation report of delivery of a deliverable item by an autonomous delivery vehicle to the target delivery location. In some implementations, the confirmation report can include an image of a deliverable item at the target delivery location after delivery by an autonomous delivery vehicle. Such image of the deliverable item can have been obtained by an image sensor (e.g., a camera) provided within the autonomous delivery vehicle.

The systems and methods described herein may provide a number of technical effects and benefits. By providing technology for implementing autonomous vehicle delivery coordinated within the last mile (e.g., across general and specific target locations associated with a plurality of end recipients), automated delivery systems and methods can advantageously achieve substantial cost savings and efficiency improvements for numerous applications including package delivery, food delivery, human transport and the like. Such advantages can be achieved at least in part by deploying a launch vehicle (e.g., an autonomous launch vehicle) to a general target location. While stationary at the general target location or while traveling an optimized launch path, a plurality of autonomous delivery vehicles can be launched to specific target delivery locations associated with various end recipients. The distributed delivery can be coordinated in a manner that optimizes launch and travel paths to reduce total travel time of the autonomous launch and delivery vehicles while increasing efficiency by routing multiple deliverable items for delivery from a centralized launch vehicle.

The systems and methods described herein may also provide a technical effect and benefit of improving recipient customization with the disclosed last mile delivery systems and methods. By providing an application configured for implementation on user computing devices associated with end recipients (e.g., recipients of deliverable items transported by the disclosed launch and delivery vehicles), such recipients can create customized target locations for delivery, adjust target locations as needed, receive confirmation reports upon successful delivery of items, and initiate/receive other advantageous notifications associated with delivery details.

The systems and methods described herein may also provide a technical effect and benefit of providing an improved autonomous launch vehicle for transporting a plurality of deliverable items from an interim location (e.g., a distribution center, transportation center) to a general target location associated with one or more end recipients. An autonomous launch vehicle can include a mobility system, a sensor system, a computing system, a communication system, and a launch system. The communication system can provide coordinated signaling between the launch vehicle and a plurality of autonomous delivery vehicles and/or RFID devices associated with various deliverable items. Certain embodiments of a launch system can advantageously provide for convenient launching and landing of a plurality of autonomous delivery vehicles. For example, a launch system can provide a first rail configured to position (and optionally charge) a plurality of autonomous delivery vehicles and a second rail configured to receive a plurality of deliverable items respectively enclosed by a portion of packaging material. The launch system can also variously include an inflation device positioned relative to a launch opening to such that an inflation device associated with each package for delivery can be inflated just before launch. A landing spike and/or launch spike can improve smooth transfer of an autonomous delivery vehicle to and from the launch vehicle.

The systems and methods described herein may also provide a technical effect and benefit of providing an improved autonomous delivery vehicle for transporting and delivering one or more deliverable items from an autonomous launch vehicle to a specific target delivery location associated with a respective end recipient for one or more deliverable items. The shape of a main body included within the autonomous delivery vehicle can be advantageously designed (e.g., as a torus, C-shape, disc, etc.) to receive and transport deliverable items via associated packaging material coupled to respective inflatable devices. The mobility system can advantageously include features for bi-directional flight so that an autonomous delivery vehicle can land in an upright position, traverse a positioning rail and launch in an inverted position. For example, such features may include bi-directional motor(s) and bi-directional prop(s), rotatable props, and/or variable pitch blades within a given rotor assembly. Autonomous delivery vehicles configured for aerial operation can provide significant flexibility in manner of flight, customizable travel paths, and coordinated launch/landing.

The systems and methods described herein may also provide resulting improvements to computing technology tasked with operation relative to the disclosed delivery systems and methods. For instance, methods of generating two-dimensional and/or three-dimensional representations of target delivery locations can improve customizable specificity and accuracy of successful deliveries. Methods of determining optimized launch paths and travel paths by analyzing mapping and localization data as well as historic and/or current traffic data can improve routing efficiency for package delivery. Improvements in speed and accuracy of planning and routing methods can ultimately lead to improved delivery of packages and other deliverable items.

With reference to the figures, example embodiments of the present disclosure will be discussed in further detail.

FIG. 1 depicts an example delivery system 100 for implementing last mile delivery for a plurality of deliverable items. Delivery system 100 can include an autonomous launch vehicle 102 and associated launch system 104 according to example embodiments of the present disclosure. In some implementations, autonomous launch vehicle 102 can correspond, for example, to a land-based vehicle (e.g., a car, a truck, a motorbike, etc.), an air-based vehicle (e.g., a drone, helicopter, airplane, etc.) and/or a water-based vehicle (e.g., a boat, submergible watercraft, etc.) Launch system 104 can be provided as part of autonomous launch vehicle 102. In some implementations, the launch system 104 can be attached to or otherwise positioned relative to a surface 105 (e.g., an upper surface such as a roof or a lower surface such as an underside) of the autonomous launch vehicle 102. The launch system 104 can be configured to house a plurality of autonomous delivery vehicles 106, each autonomous delivery vehicle 106 assigned for transporting one or more deliverable items from the autonomous launch vehicle 102 to respective specific target delivery locations.

Each autonomous delivery vehicle 106 can correspond, for example, to a land-based vehicle (e.g., a car, a truck, a motorbike, etc.), an air-based vehicle (e.g., a drone, helicopter, airplane, hovercraft, etc.) and/or a water-based vehicle (e.g., a boat, submergible watercraft, etc.) In some implementations, each autonomous delivery vehicle 106 is generally smaller in size than the autonomous launch vehicle 102. In particular implementations, an autonomous launch vehicle 102 is a land-based vehicle and the plurality of autonomous delivery vehicles 106 are air-based vehicles (e.g., remote-piloted or autonomously navigating drones) and/or land-based vehicles that are smaller in size than the autonomous launch vehicle 102. Although such autonomous delivery vehicles 106 are described herein as being launched from an autonomous launch vehicle 102, it should be appreciated that such autonomous delivery vehicles 106 can alternatively be used with a launch vehicle that is not autonomous, but that is instead manually operated and controlled to a general target location before launching associated autonomous delivery vehicles 106.

Referring still to FIG. 1, the delivery system 100 (including autonomous launch vehicle 102 and plurality of autonomous delivery vehicles 106) can be employed for use in numerous applications including but not limited to package delivery, food delivery, human transport and the like. For example, delivery system 100 can be configured to transport payloads for each autonomous delivery vehicle 106. Such payloads can include deliverable items (e.g., perishables, non-perishables, mail packages, people, animals, other objects) that are transported from an interim location (e.g., a distribution center, transportation center) to a general target location associated with one or more end recipients. In particular, the autonomous launch vehicle 102 can be configured to transport the plurality of autonomous delivery vehicles 106 which can be launched from the autonomous launch vehicle 102 to transport the deliverable items the remaining distance from the general target location to respective specific target delivery locations associated with each end recipient. If after launch of an autonomous delivery vehicle 106, an associated payload has failed to be delivered to the specific target delivery location, the autonomous delivery vehicle 106 can return to the autonomous launch vehicle 102 and deposit its deliverable items in a package receptacle 108 provided in a location relative to launch system 104 (e.g., on surface 105 of autonomous launch vehicle 102).

Figure 2A:
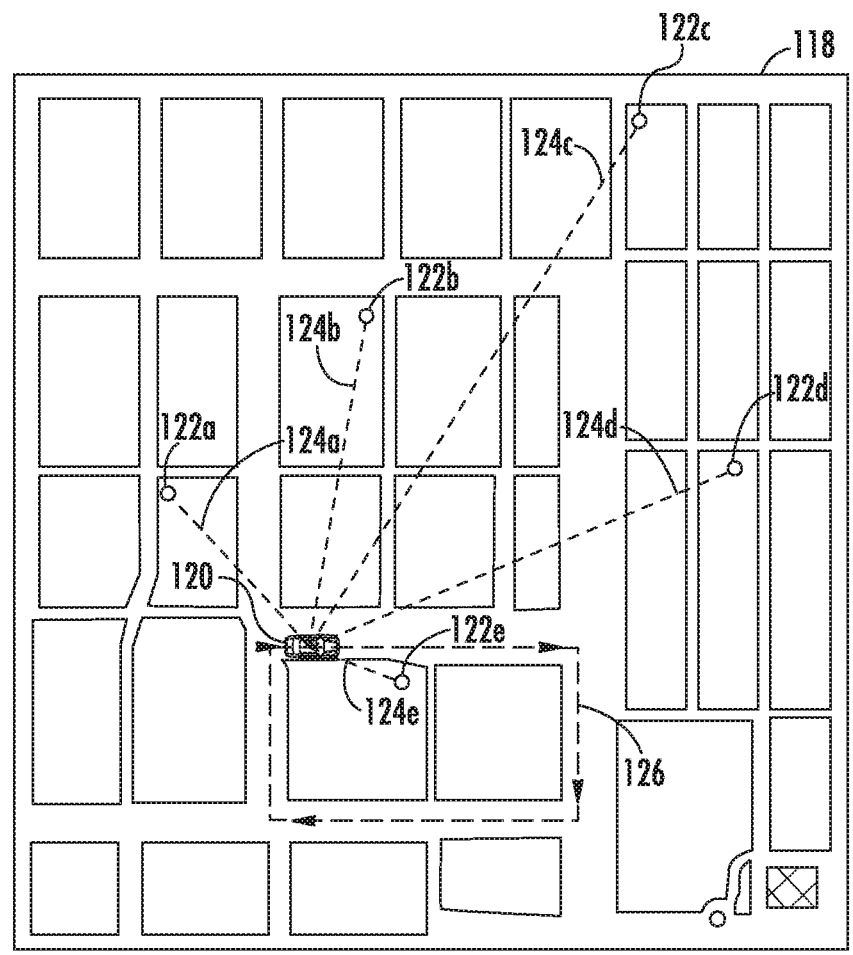
FIG. 2A-2C depict respective example maps with a launch path for a launch vehicle and travel paths for a plurality of autonomous delivery vehicles according to example embodiments of the present disclosure.
Figure 2B:
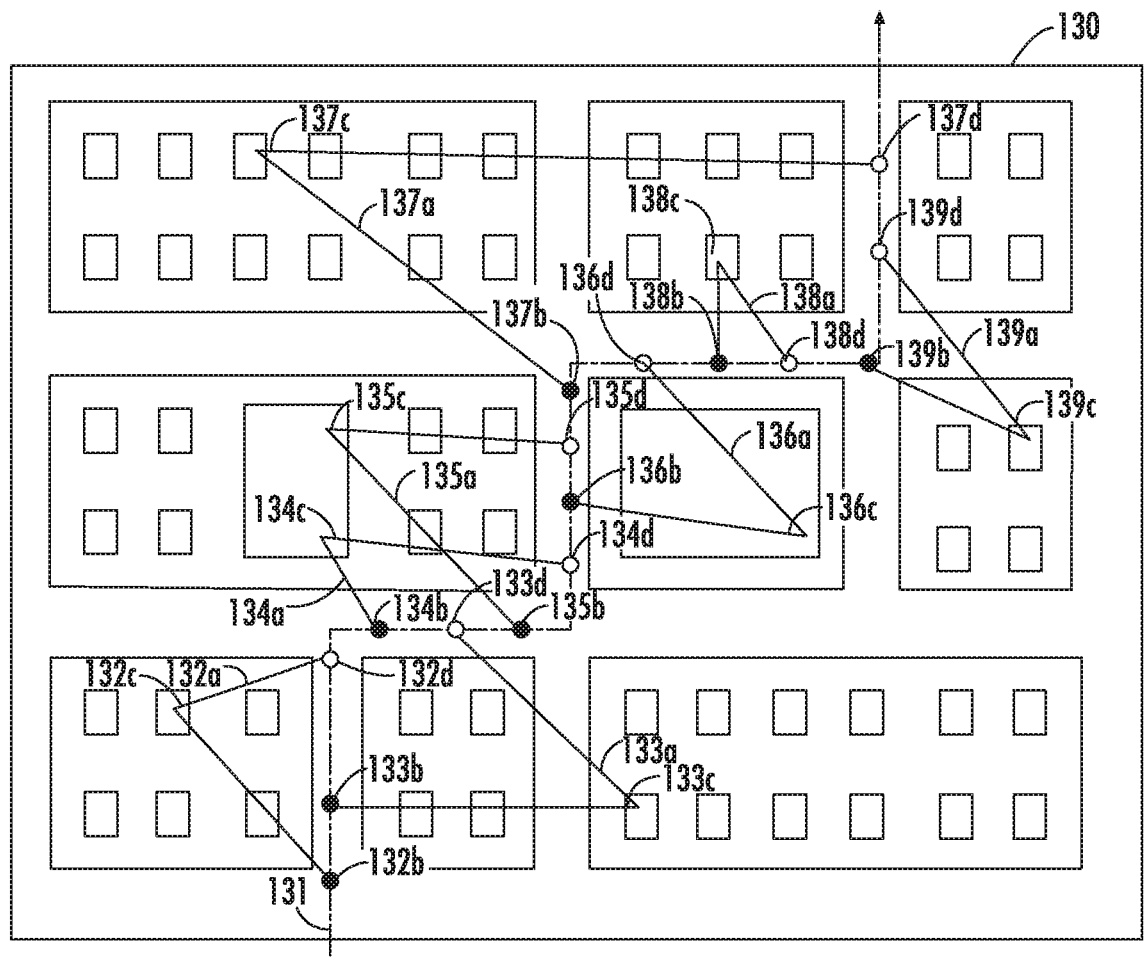
Figure 2C:
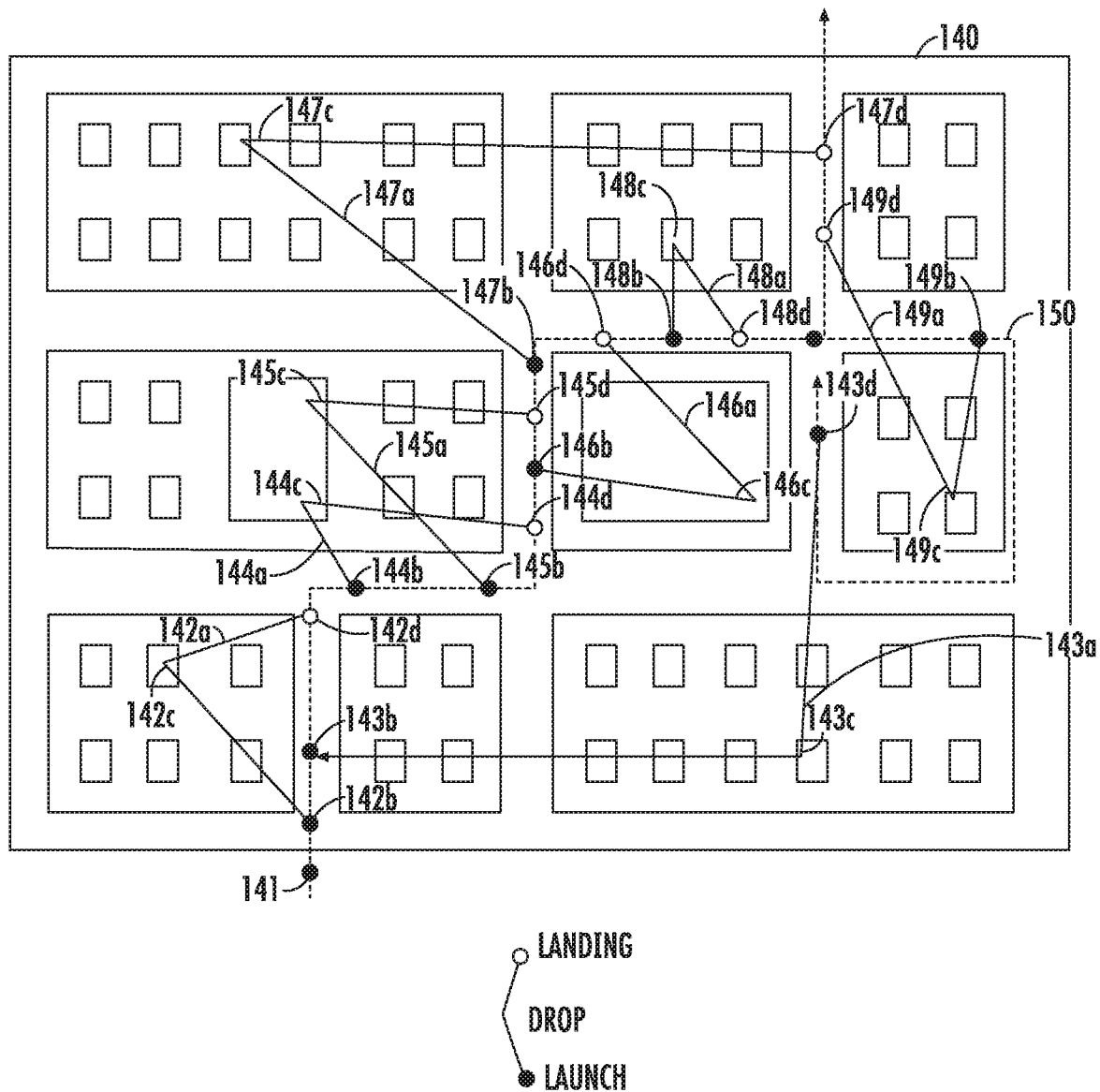

Referring now to FIGS. 2A-2C, respective example maps illustrate example locations and paths for travel of vehicles in a delivery system (e.g., delivery system 100 of FIG. 1). More particularly, an autonomous launch vehicle (e.g., autonomous launch vehicle 102 of FIG. 1) can provide transportation for a plurality of deliverable items from a distribution center to one or more general target locations.

FIG. 2A depicts a first example map 118 representing a particular geographic area, where map 118 includes a general target location 120. In some implementations, general target location 120 corresponds to a single predetermined position to which a launch vehicle (e.g., autonomous launch vehicle 102) travels and remains stationary while launching one or more autonomous delivery vehicles (e.g., autonomous delivery vehicles 106) and their associated payloads and awaiting return of the autonomous delivery vehicles to the launch vehicle.

Each autonomous delivery vehicle can be controlled to travel in accordance with a travel path from the autonomous launch vehicle to the specific target delivery location and from the specific target delivery location back to the autonomous launch vehicle. For example, FIG. 2A depicts five specific target delivery locations 122a-122e and associated example travel paths 124a-124e for five different autonomous delivery vehicles. Each autonomous delivery vehicle can be controlled to travel in accordance with one of the travel paths 124a-124e to a corresponding specific target delivery location 122a-122e and from the specific target delivery locations 122a-122e back to the general target location 120 associated with the launch vehicle. In some implementations, specific target delivery locations 122a-122e can be associated with a respective end recipient for one or more deliverable items. In some implementations, specific target delivery locations 122a-122e can be associated with respective destination locations for one or more passengers. In some implementations, the specific target delivery locations 122a-122e can correspond to a particular set of GPS coordinates, a street address, a model or other dataset associated with delivery localization data (e.g., a three-dimensional model generated from an image or other delivery localization data based on target location information provided via an interactive recipient delivery application).

Referring still to FIG. 2A, in some implementations, general target location 120 more particularly corresponds to a predetermined launch path 126 along which the launch vehicle (e.g., autonomous launch vehicle 102) travels for multiple iterations. Instead of multiple autonomous delivery vehicles being launched from the same launch position (e.g., general target location 120), launch path 126 can accommodate launch of multiple autonomous delivery vehicles from one or more different launch positions along launch path 126. In some implementations, the different launch positions along launch path 126 can be determined in order to reduce and/or balance the length/distance of the respective travel paths (e.g., travel paths 124a-124e) for respective autonomous delivery vehicles. In some implementations, the different launch positions along a launch path 126 can additionally or alternatively be dynamically determined based on real-time conditions such as traffic, road closures, wind speeds or other weather conditions, or other suitable factors.

FIG. 2B depicts a second example map 130 representing a particular geographic area including a general target location corresponding to a predetermined launch path 131 along which a launch vehicle (e.g., autonomous launch vehicle 102) can travel for one or more iterations. Launch path 131 is determined to accommodate launch of multiple autonomous delivery vehicles in accordance with a respective plurality of travel paths 132a-139a along launch path 131. Each autonomous delivery vehicle can be controlled to travel in accordance with a respective travel path 132a-139a from a respective launch position 132b-139b to a respective specific target delivery location 132c-139c and from the respective specific target delivery location 132c-139c back to a respective landing position 132d-139d.

Each respective launch position 132b-139b and landing position 132d-139d associated with a travel path 132a-139a for an autonomous delivery vehicle can be configured to correspond to a point along launch path 131 associated with an autonomous launch vehicle. In some implementations, the different travel paths 132a-139a including launch positions 132b-132d and landing positions 132d-139d along launch path 131 can be determined in order to reduce and/or balance the length/distance of the respective travel paths (e.g., travel paths 132a-139a) for respective autonomous delivery vehicles. In some implementations, the different travel paths 132a-139a including launch positions 132b-139b and landing positions 132d-139d can additionally or alternatively be dynamically determined based on real-time conditions such as traffic, road closures, wind speeds or other weather conditions, delivery time/delays, or other suitable factors.

Referring still to FIG. 2B, in some implementations, specific target delivery locations 132c-139c can be associated with a respective end recipient for one or more deliverable items. In some implementations, specific target delivery locations 132c-139c can be associated with respective destination locations for one or more passengers. In some implementations, the specific target delivery locations 132c-139c can correspond to a particular set of GPS coordinates, a street address, a model or other dataset associated with delivery localization data (e.g., a three-dimensional model generated from an image or other delivery localization data based on target location information provided via an interactive recipient delivery application).

FIG. 2C depicts a third example map 140 representing a particular geographic area including a general target location for delivery. The general target location can correspond to a predetermined launch path 141 for a launch vehicle that is dynamically modified during launch and landing of delivery vehicles to include at least one modified launch path portion 150. More particularly, launch path 141 of FIG. 2C is similar to launch path 131 of FIG. 2B except that the example modified launch path portion 150 of FIG. 2C includes an additional loop added between launch positions 148b and 149b to accommodate a delayed delivery at specific target delivery location 143c. For example, consider that the respective travel paths 142a and 144a-148a of FIG. 2C are the same as respective travel paths 132a and 134a-138a of FIG. 2B. As such, respective launch positions 142b and 144b-148b of FIG. 2C are the same as respective launch positions 132b and 134b-138b of FIG. 2B, respective specific target delivery locations 142c and 144c-148c of FIG. 2C are the same as respective specific target delivery locations 132c and 134c-138c of FIG. 2B, and respective landing positions 142d and 144d-148d of FIG. 2C are the same as respective landing positions 132d and 134d-138d of FIG. 2B. However, travel path 143a of FIG. 2C has a slightly different specific target delivery location 143c than the specific target delivery location 133c of travel path 133a of FIG. 2B, resulting from a delay in delivery due to rerouting, recalculation, or the like. This delay in delivery at specific target delivery location 143c of FIG. 2C requires a different landing position 143d, which is why a loop is dynamically created within modified launch path portion 150 to accommodate the landing of the delivery vehicle associated with travel path 143a. Modification of the original launch path 141 also changes the launch position 149b and landing position 149d of travel path 149a in FIG. 2C relative to the launch position 139b and landing position 139d of travel path 139a in FIG. 2B.

Launch of each autonomous delivery vehicle from one or more particular launch positions at one or more particular launch times and/or landing of each autonomous delivery vehicle at one or more particular landing positions at one or more particular landing times can be controlled by a dedicated controller within a launch system (e.g., launch system 104 of FIG. 1) or by a vehicle computing system associated with the autonomous launch vehicle (e.g., autonomous launch vehicle 102 of FIG. 1).

Figure 3:
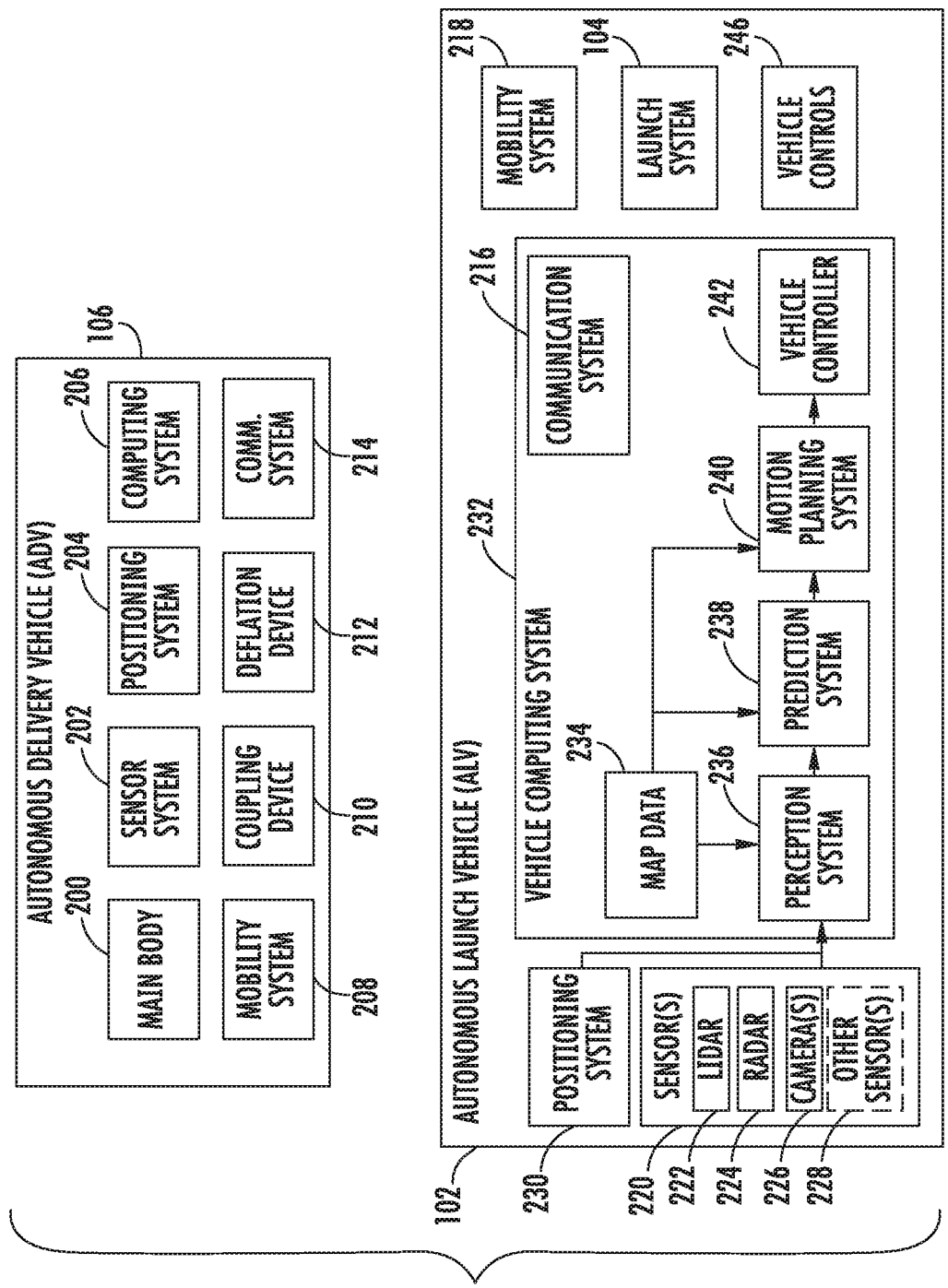
FIG. 3 depicts a block diagram of an example autonomous delivery vehicle and autonomous launch vehicle according to example embodiments of the present disclosure.

FIG. 3 depicts a block diagram of an example autonomous delivery vehicle 106 and autonomous launch vehicle 102 according to example embodiments of the present disclosure. Autonomous delivery vehicle 106 can include a plurality of functional components including various systems and devices configured to control the operation of the autonomous delivery vehicle 106. Such components of autonomous delivery vehicle 106 can include but are not limited to a main body 200, a sensor system 202, a positioning system 204, a computing system 206, a mobility system 208, a coupling device 210, a deflation device 212, and a communication system 214.

In some implementations, the main body 200 of autonomous delivery vehicle 106 can be configured to provide support for transporting a deliverable item. In some implementations, the main body 200 of autonomous delivery vehicle 106 can be characterized as having a generally toroidal shape. In some implementations, the main body 200 of autonomous delivery vehicle 106 can be characterized as a generally C-shaped disc. Additional description of such an exemplary main body 200 is provided in and with reference to FIGS. 4 and 5A-5C, respectively.

In some implementations, sensor system 202 of autonomous delivery vehicle 106 can include one or more sensors such as but not limited to cameras (e.g., mono cameras, infrared cameras, stereo cameras, etc.), Light Detection and Ranging (LIDAR) systems and/or Range Detection and Ranging (RADAR) systems. Sensor system 202 can obtain sensor data from such sensor(s), attempt to comprehend the environment surrounding autonomous delivery vehicle 106 by performing various processing techniques on the sensor data from sensor system 202, and generate an appropriate motion plan through the surrounding environment of autonomous delivery vehicle 106. In addition, one or more sensors within sensor system 202 (e.g., a camera or other image sensor) associated with autonomous delivery vehicle 106 can be configured to obtain sensor data descriptive of the environment proximate to the autonomous delivery vehicle 106 and identify one or more target delivery locations for delivering one or more deliverable items. For example, real-time sensor data obtained by sensor system 202 (e.g., images, LIDAR point clouds, RADAR data, and/or SONAR data) can be compared with localized target patterns or other localization data associated with a target delivery location in a database.

In some implementations, positioning system 204 can be configured to determine a specific location of the autonomous delivery vehicle 106 relative to a geographic coordinate system, a specific target delivery location, a location of an autonomous launch vehicle 102, or other locations. The positioning system 204 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position. The position of the autonomous delivery vehicle 106 determined by positioning system 204 can be used by various other systems of the autonomous delivery vehicle 106 (e.g., computing system 206, mobility system 208, etc.).

In some implementations, autonomous delivery vehicle 106 can include an onboard computing system 206 for operating the autonomous delivery vehicle 106 (e.g., located on or within the autonomous delivery vehicle 106). Computing system 206 can include an autonomy system for perceiving objects in the surrounding environment (e.g., by analyzing sensor data obtained by sensor system 202), predicting future locations and paths associated with such objects, generating a motion plan that navigates through the surrounding environment based on map data as well as the predicted location of surrounding objects, and outputting vehicle control signals to control motion of the autonomous delivery vehicle 106 in accordance with the motion plan. Computing system 206 can also be configured to coordinate integration of data among other systems within autonomous delivery vehicle 106.

In some implementations, mobility system 208 can include one or more physical components configured to operate in conjunction with computing system 206 and other components of autonomous delivery vehicle 106 for travel along one or more travel paths (e.g., for travel to and from a specific target delivery location). When the autonomous delivery vehicle 106 comprises an aerial vehicle, the mobility system 208 of autonomous delivery vehicle 106 can include a bi-directional rotor assembly configured to provide either positive or negative thrust. For instance, the mobility system 208 of the autonomous delivery vehicle 106 can include a plurality of pairs of counter-rotational rotors, wherein each pair includes one rotor configured for rotation in a first direction and one rotor configured for rotation in a second direction (e.g., the second direction being generally opposite the first direction). To achieve stable hovering flight for the autonomous delivery vehicle 106, a level of thrust can be equalized through all rotors. To achieve directional flight, thrust is increased within one or more particular rotors to achieve movement in a desired direction. For aerial vehicles, the mobility system 208 can further include a gyro-stabilization system to facilitate consistent operation in a neutral hovering position when needed. In some implementations, an (aerial) autonomous delivery vehicle 106 can be configured for bi-directional flight such that the autonomous delivery vehicle 106 can operate in either a first position wherein a top surface of the main body 200 travels in an upward orientation or a second position wherein a top surface of the main body 200 travels in a downward orientation. In order to achieve such bi-directional flight, mobility system 208 of (aerial) autonomous delivery vehicle 106 can include bi-directional motor(s) and bi-directional prop(s), rotatable props, and/or variable pitch blades within a given rotor assembly.

In some implementations, autonomous delivery vehicle 106 can include one or more coupling devices 210, each coupling device 210 configured to secure and release an inflatable device associated with a corresponding deliverable item enclosed in packaging material. In some implementations, each coupling device 210 can include the inflatable device (e.g., an inflatable bladder) that can expand after entering an opening in a packaging material and later deflate to drop one or more deliverable items at a target location. In some implementations, each coupling device 210 can include a permanent magnet attached to an electromagnet (e.g., a metallic disk) for magnetic coupling of a packaging material to an inflatable device. The electromagnet attached to the permanent magnet can be caused to have a reversed magnetic field just long enough to release the packaging material and deliverable item for drop at a target location. In other implementations, the coupling device 210 can include an actuating ring that can secure and release the tether. For example, the tether can include multiple legs with rings on each leg, the legs being detachable from the rings for delivery. The ring configuration can accommodate a symmetrical geometry that will always have one ring facing skyward.

In some implementations, each autonomous delivery vehicle 106 can include a deflation device 212 for subjecting an inflated inflation device when inflated to an electrostatic, thermal, and/or mechanical force causing an inflated device to pop and deflate. Deflation device 212 can include a surface piercing mechanism configured to break the membrane of an inflated device. For example, deflation device 212 of autonomous delivery vehicle 106 can include an actuating pin or spike that pops the inflation device to release a package. In another example, a deflation device 212 of an autonomous delivery vehicle 106 can include a thin electric heating element (e.g., an electrical arch or spark) that is turned on to melt the inflatable bladder in a manner similar to popping a balloon. In another example, deflation device 212 can include a pressurized outlet configured to generate a stream of fluid, gas, or other suitable substance to break the membrane of an inflated device.

In some implementations, each autonomous delivery vehicle 106 can further include a communication system 214 such that the autonomous delivery vehicle 106 is configured to communicate with one or more computing devices that are remote from the autonomous delivery vehicle 106. For example, each autonomous delivery vehicle 106 can wirelessly communicate with an operations computing system that can be associated with an entity for providing a delivery service. The communication system 214 of each autonomous delivery vehicle 106 can also enable such autonomous delivery vehicle 106 to wirelessly communicate with an autonomous launch vehicle 102 from which the autonomous delivery vehicle 106 is configured to launch and/or land after travel to/from one or more target locations associated with one or more end recipients. When the communication system 214 of each autonomous delivery vehicle 106 is used to communicate with one or more autonomous launch vehicles 102, the communication system 214 can be configured to maintain wireless communication with the autonomous launch vehicle after the autonomous delivery vehicle launches from the launch vehicle for travel to a specific target delivery location and return from the specific target delivery location to a location associated with the launch vehicle. Communication system 214 can include any suitable components for interfacing with one or more network(s), including, for example, transmitters, receivers, ports, controllers, antennas, and/or other suitable components that can help facilitate communication.

Communication system 214 can also be configured to directly communicate with RFID components or other tracking devices associated with the deliverable item(s) transported on each autonomous delivery vehicle 106. For example, communication system 214 can be configured to gather information provided by an encoded datasource associated with each deliverable item. Each encoded datasource can contain information describing a target delivery location. For example, the encoded datasource can contain information corresponding to one or more geographic identifiers (e.g., GPS coordinates, street address, or other suitable identifiers) and/or localized target patterns or other localization data associated with a target delivery location. In some embodiments, the encoded datasource corresponds to a barcode, QR code or other machine-readable symbol associated with the deliverable item(s). In some embodiments, the encoded datasource corresponds to a radio-frequency identification (RFID) device such as a near-field communication (NFC) chip or other passive device tag configured for wireless communication with a computing system 206 associated with the autonomous delivery vehicle 106.

Referring still to FIG. 3, autonomous launch vehicle 102 can include various systems and devices configured to control the operation of the autonomous launch vehicle. For example, the autonomous launch vehicle 102 can include the launch system 104, a communication system 216, a mobility system 218, one or more sensors 220 (e.g., a Light Detection and Ranging (LIDAR) system 222, a Radio Detection and Ranging (RADAR) system 224, one or more cameras 226 and/or other sensors 228 (e.g., a Sound Navigation and Ranging (SONAR) system, an X-RAY system, etc.), a positioning system 230, a vehicle computing system 232, and vehicle controls 246.

Generally, the onboard vehicle computing system 232 can be configured for operating the autonomous launch vehicle 102 (e.g., located on or within the autonomous launch vehicle). The vehicle computing system 232 can receive sensor data from sensor(s) onboard the autonomous launch vehicle (e.g., one or more cameras (e.g., mono cameras, infrared cameras, stereo cameras, etc.), Light Detection and Ranging (LIDAR) systems, and/or Range Detection and Ranging (RADAR) systems), attempt to comprehend the launch vehicle's surrounding environment by performing various processing techniques on the sensor data, and generate an appropriate motion plan through the launch vehicle's surrounding environment. As such, the vehicle computing system 232 can include an autonomy system for perceiving objects in the surrounding environment, predicting future locations and paths associated with such objects, generating a motion plan that navigates through the surrounding environment based on map data 234 as well as the predicted location of surrounding objects, and outputs vehicle control signals to control motion of the autonomous launch vehicle 102 in accordance with the motion plan. In some implementations, a motion plan for the autonomous launch vehicle 102 is further generated in accordance with a launch path for launching a plurality of autonomous delivery vehicles 106 as discussed herein.

In some implementations, vehicle computing system 232 can further be connected to, or include, a positioning system 230. Positioning system 230 can determine a current geographic location of the autonomous launch vehicle 102. The positioning system 230 can be any device or circuitry for analyzing the position of the autonomous launch vehicle 102. For example, the positioning system 230 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position. The position of the autonomous launch vehicle 102 can be used by various systems of the vehicle computing system 232.

The vehicle computing system 232 can assist in controlling the autonomous launch vehicle 102. In particular, the vehicle computing system 232 can receive sensor data from the one or more sensors 220, attempt to comprehend the surrounding environment by performing various processing techniques on data collected by the sensors 220, and generate an appropriate motion path through such surrounding environment. The vehicle computing system 232 can control the one or more vehicle controls 246 to operate the autonomous launch vehicle 102 according to the motion path.

As illustrated in FIG. 3, in some embodiments, the vehicle computing system 232 can include a perception system 236, a prediction system 238, and a motion planning system 240 that cooperate to perceive the surrounding environment of the autonomous launch vehicle 102 and determine a motion plan for controlling the motion of the autonomous launch vehicle 102 accordingly.

In particular, in some implementations, the perception system 236 can receive sensor data from the one or more sensors 220 that are coupled to or otherwise included within the autonomous launch vehicle 102. As examples, the one or more sensors 220 can include a Light Detection and Ranging (LIDAR) system 222, a Radio Detection and Ranging (RADAR) system 224, one or more cameras 226 (e.g., visible spectrum cameras, infrared cameras, etc.), and/or other sensors 228. The sensor data can include information that describes the location of objects within the surrounding environment of the autonomous launch vehicle 102.

As one example, for LIDAR system 222, the sensor data can include the location (e.g., in three-dimensional space relative to the LIDAR system 222) of a number of points that correspond to objects that have reflected a ranging laser. For example, LIDAR system 222 can measure distances by measuring the Time of Flight (TOF) that it takes a short laser pulse to travel from the sensor to an object and back, calculating the distance from the known speed of light.

As another example, for RADAR system 224, the sensor data can include the location (e.g., in three-dimensional space relative to RADAR system 224) of a number of points that correspond to objects that have reflected a ranging radio wave. For example, radio waves (pulsed or continuous) transmitted by the RADAR system 224 can reflect off an object and return to a receiver of the RADAR system 224, giving information about the object's location and speed. Thus, RADAR system 224 can provide useful information about the current speed of an object.

As yet another example, for one or more cameras 226, various processing techniques (e.g., range imaging techniques such as, for example, structure from motion, structured light, stereo triangulation, and/or other techniques) can be performed to identify the location (e.g., in three-dimensional space relative to the one or more cameras 226) of a number of points that correspond to objects that are depicted in imagery captured by the one or more cameras 226. Other sensor systems 228 can identify the location of points that correspond to objects as well.

Thus, the one or more sensors 220 can be used to collect sensor data that includes information that describes the location (e.g., in three-dimensional space relative to the autonomous launch vehicle 102) of points that correspond to objects within the surrounding environment of the autonomous launch vehicle 102.

In addition to the sensor data, the perception system 236 can retrieve or otherwise obtain map data 234 that provides detailed information about the surrounding environment of the autonomous launch vehicle 102. The map data 234 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 232 in comprehending and perceiving its surrounding environment and its relationship thereto.

The perception system 236 can identify one or more objects that are proximate to the autonomous launch vehicle 102 based on sensor data received from the one or more sensors 220 and/or the map data 234. In particular, in some implementations, the perception system 236 can determine, for each object, state data that describes a current state of such object. As examples, the state data for each object can describe an estimate of the object's: current location (also referred to as position); current speed; current heading (also referred to together as velocity); current acceleration; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 236 can determine state data for each object over a number of iterations. In particular, the perception system 236 can update the state data for each object at each iteration. Thus, the perception system 236 can detect and track objects (e.g., vehicles, pedestrians, bicycles, and the like) that are proximate to the autonomous launch vehicle 102 over time.

The prediction system 238 can receive the state data from the perception system 236 and predict one or more future locations and/or moving paths for each object based on such state data. For example, the prediction system 238 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 240 can determine a motion plan for the autonomous launch vehicle 102 based at least in part on the predicted one or more future locations and/or moving paths for the object provided by the prediction system 238 and/or the state data for the object provided by the perception system 236. Stated differently, given information about the current locations of objects and/or predicted future locations and/or moving paths of proximate objects, the motion planning system 240 can determine a motion plan for the autonomous launch vehicle 102 that best navigates the autonomous launch vehicle 102 relative to the objects at such locations.

As one example, in some implementations, the motion planning system 240 can determine a cost function for each of one or more candidate motion plans for the autonomous launch vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous launch vehicle 102 approaches a possible impact with another object and/or deviates from a preferred pathway (e.g., a preapproved pathway).

Thus, given information about the current locations and/or predicted future locations and/or moving paths of objects, the motion planning system 240 can determine a cost of adhering to a particular candidate pathway. The motion planning system 240 can select or determine a motion plan for the autonomous launch vehicle 102 based at least in part on the cost function(s). For example, the candidate motion plan that minimizes the cost function can be selected or otherwise determined. The motion planning system 240 can provide the selected motion plan to a vehicle controller 242 that controls one or more vehicle controls 246 (e.g., actuators or other devices that control gas flow, acceleration, steering, braking, etc.) to execute the selected motion plan.

Each of the perception system 236, the prediction system 238, the motion planning system 240, and the vehicle controller 242 can include computer logic utilized to provide desired functionality. In some implementations, each of the perception system 236, the prediction system 238, the motion planning system 240, and the vehicle controller 242 can be implemented in hardware, firmware, and/or software controlling a general purpose processor. For example, in some implementations, each of the perception system 236, the prediction system 238, the motion planning system 240, and the vehicle controller 242 includes program files stored on a storage device, loaded into a memory, and executed by one or more processors. In other implementations, each of the perception system 236, the prediction system 238, the motion planning system 240, and the vehicle controller 242 includes one or more sets of computer-executable instructions that are stored in a tangible computer-readable storage medium such as RAM hard disk or optical or magnetic media.

In some implementations, autonomous launch vehicle 102 can include a communication system 216 such that the autonomous launch vehicle 102 is configured to communicate with one or more computing devices that are remote from the autonomous launch vehicle 102. For example, the autonomous launch vehicle 102 can wirelessly communicate with one or more operations computing systems that can be associated with an entity for managing a delivery service. The operations computing system can help the entity monitor, communicate with, manage, etc. the fleet of launch vehicles, delivery vehicles, deliverable items, and the like. The communication system 216 of the autonomous launch vehicle 102 can also facilitate the autonomous launch vehicle 102 to wirelessly communicate with a plurality of autonomous delivery vehicles 106 configured to launch from the autonomous launch vehicle 102 and deliver respective deliverable items to one or more target locations associated with one or more end recipients. When the communication system 216 of the autonomous launch vehicle 102 is used to communicate with one or more autonomous delivery vehicles 106, the communication system 216 can be configured to maintain wireless communication with each autonomous delivery vehicle 106 after the autonomous delivery vehicle 106 launches from the autonomous launch vehicle 102 for travel to a specific target delivery location and return from the specific target delivery location to the autonomous launch vehicle 102. The communication system 216 of the autonomous launch vehicle 102 can also be used for package tracking either by communicating with autonomous delivery vehicles 106 during delivery travel and/or directly with RFID components or other tracking devices associated with the deliverable item(s) transported on each autonomous delivery vehicle 106. Communication system 216 can include any suitable components for interfacing with one or more communication network(s), including, for example, transmitters, receivers, ports, controllers, antennas, and/or other suitable components that can help facilitate communication.

Autonomous launch vehicle 102 can also include a mobility system 218 configuring the autonomous launch vehicle for travel to and from various general target locations. In some implementations, the general target location can correspond to a single predetermined position to which the autonomous launch vehicle 102 can travel to and remain stationary. In some implementations, the general target location includes a predetermined launch path along which the autonomous launch vehicle 102 can travel for one or more consecutive iterations. When the autonomous launch vehicle 102 comprises a land-based vehicle, the general target location can include a predetermined launch path along with the autonomous launch vehicle can travel in-lane with other land-based traffic in a geographic area. In some implementations, mobility system 218 can include one or more physical components configured to operate in conjunction with vehicle computing system 232 and other components of autonomous launch vehicle 102 for travel. When the autonomous launch vehicle 102 comprises a land-based vehicle, the mobility system 218 of autonomous launch vehicle 102 can include one or more wheel assemblies for traversing a ground surface.

Figure 4:
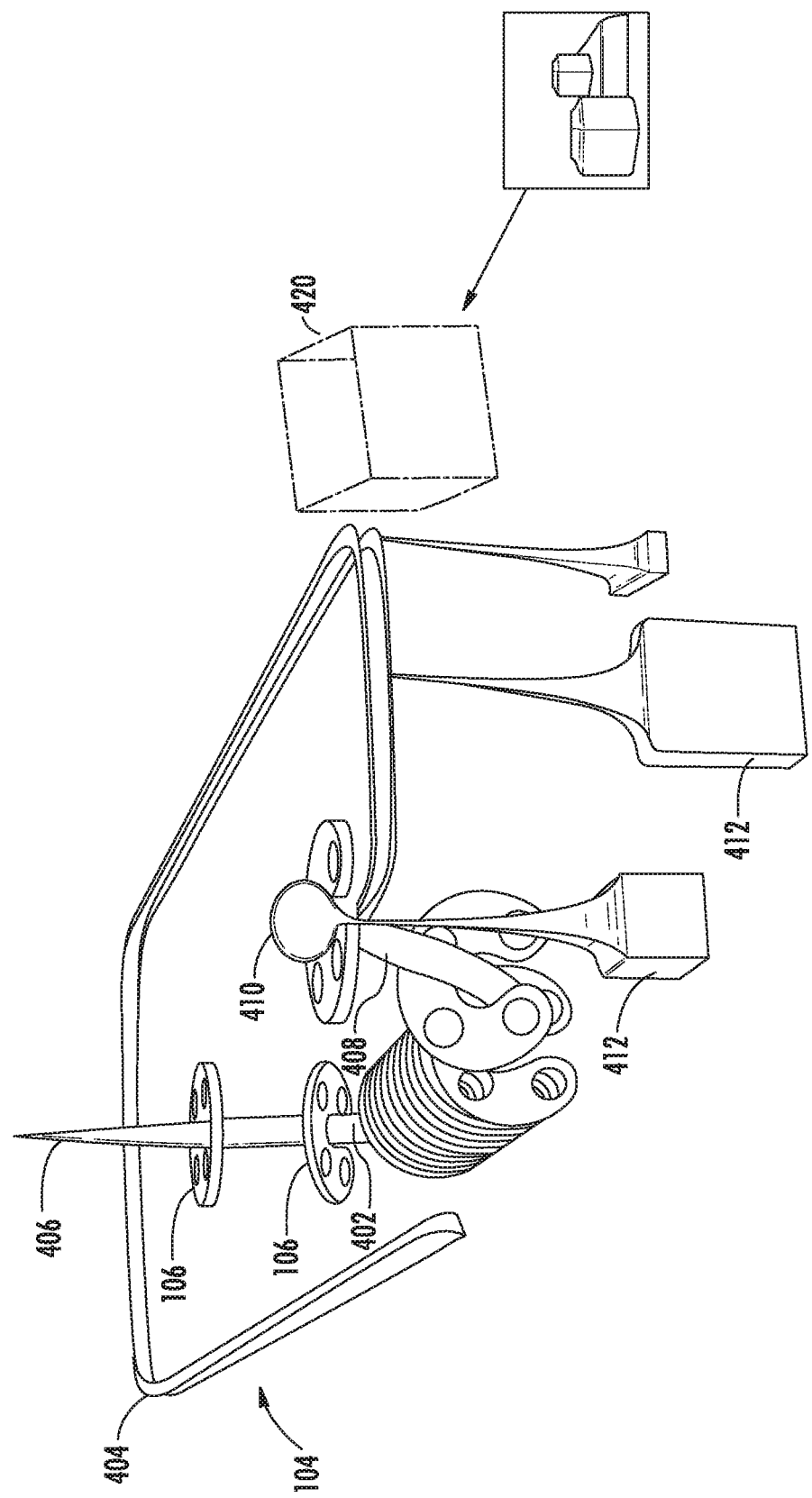
FIG. 4 depicts an example launch system according to example embodiments of the present disclosure.

FIG. 4 depicts an example launch system 104 according to example embodiments of the present disclosure. In some embodiments, a launch system 104 included within or otherwise associated with an autonomous launch vehicle 102 can more particularly include a first rail 402 and a second rail 404. The first rail 402 can be configured to receive a plurality of autonomous delivery vehicles 106, for example, by positioning the first rail 402 within C-shaped grooves, holes or other openings defined by the shape of the autonomous delivery vehicles 106. In some implementations, the first rail 402 can be a positioning structure as well as a charging rail configured to transfer electric power (e.g., conductive charging, inductive charging, electromagnetic charging, etc.) to a battery or other power source within the plurality of autonomous delivery vehicles 106. A supplemental and/or alternative power transfer system can include features for swapping batteries or implementing chemical energy transfer (e.g., pumping of fresh electrolyte or other suitable material into a fuel cell or liquid battery provided within the autonomous delivery vehicle(s) 106.) The second rail 404 can be configured to receive a plurality of deliverable items respectively enclosed by a portion of packaging material 412. Each distinct portion of packaging material 412 can be paired with an autonomous delivery vehicle 106 for transporting one or more of the plurality of deliverable items to a target location. The second rail 404 can be configured as a package conveyer machine along with the portions of packaging material 412 and associated deliverable items can be moved for successive pairing with an autonomous delivery vehicle 106.

In some implementations, the launch system 104 can include an inflation system 410 positioned relative to a launch opening of the launch system 104. The inflation system 410 can be configured to pump one or more gases (e.g., air, helium or other suitable gas) into a plurality of inflatable bladders (e.g., inflatable balloons or the like) associated with each portion of packaging material 412. In some implementations, an end of the first rail 402 can be positioned towards an end of the second rail 404 at the launch opening such that an inflatable device can be pumped with air and coupled with a corresponding deliverable item enclosed in packaging material 412 and a corresponding autonomous delivery vehicle 106.

In some implementations, such as when each portion of packaging material 412 is associated with an expandable device that can expand without sole use of one or more inflatable gases, then the inflation system 410 within launch system 104 can be referred to as an expansion system configured to implement expansion of the expandable devices. Expandable devices can be expanded, for example, using non-gas substances such as liquids or solids or rigid or semi-rigid frames coupled to the interior and/or exterior of a portion of packaging material as an alternative to or in addition to inflatable gases.

In some implementations, the launch system 104 can further include a launch spike 408. A launch spike 408 can be coupled to a first end of the first rail 402 proximate to the inflation system 410 and launch opening from which the plurality of autonomous delivery vehicles 106 are aerially launched. As each distinct portion of packaging material 412 and enclosed deliverable item(s) controllably moves along the second rail 404 towards the launch opening, a tether containing an encoded datasource (e.g., an RFID device such as an NFC chip or the like, a machine-readable symbol such as a barcode, QR code or the like) can be caught up in the torus shape of the autonomous delivery vehicle 106 as it lifts the package contained in the portion of packaging material 412. When an autonomous delivery vehicle 106 reaches a target delivery location, it can lower itself with the deliverable item(s) to the target, then can pop the inflatable device releasing the package on the target.

In some implementations, the launch system 104 can further include a landing spike 406. Upon returning to an autonomous launch vehicle after transporting the deliverable item(s), an autonomous delivery vehicle 106 can be controlled to maneuver for landing on the landing spike 406. In some implementations, the landing spike 406 is coupled to a second end of the first rail 402 such that the autonomous delivery vehicle 106 can slide down the landing spike 406 and onto the first rail 402 for charging, reloading with one or more next deliverable items and subsequent launch to a new target location. A position marker (e.g., a wireless beacon, a visual symbol) can also be included within the launch system 104 or other portion of an autonomous launch vehicle 102 for guiding the plurality of autonomous delivery vehicles 106 to return for landing at the landing spike 406 or other location.

The optional provision of launch spike 408 and/or landing spike 406 can advantageously help to provide secure positional features within the launch system 104 such that autonomous delivery vehicles 106 can more safely launch and/or land during a variety of weather conditions, operational conditions, and the like. More particularly, a launch spike 408 and/or landing spike 406 can provide lateral stability for aerial launch and/or landing while under influence from forces on the delivery vehicle such as cross winds, launch vehicle acceleration or lateral G-Forces Such spike(s) can help prevent an autonomous delivery vehicle 106 from colliding with the sides of launch and/or landing openings or other parts of a launch vehicle (e.g., autonomous launch vehicle 102).

Although the embodiments herein describe a launch system 104 positioned within or otherwise associated with an autonomous launch vehicle 102, it should be appreciated that the described launch system 104 can additionally or alternatively be provided on other structures such as other vehicles (e.g., non-autonomous vehicles such as automobiles, trucks, buses, trains, boats, aerial vehicles) or on surfaces of warehouses or other buildings, parking locations, roofs or other suitable locations. Autonomous delivery vehicles 106 can be variously launched from a coordinated and distributed network of multiple launch systems 104 regardless of the static and/or dynamic location of each launch system 104.

In some implementations, launch system 104 can include a package receptacle 420 configured to receive deliverable items that have failed to be delivered to their respective target locations. In some examples, package receptacle 420 can be similar to package receptacle 108 depicted in FIG. 1. When a deliverable item fails to be delivered to a target delivery location, an autonomous delivery vehicle 106 can be configured to first navigate to package receptacle 420 before navigating to landing spike 406. Once the autonomous delivery vehicle 106 and its associated portion of packaging material 412 enclosing an undelivered package is positioned over or sufficiently near to package receptacle 420, a deflation device (e.g., deflation device 212 of FIG. 3) associated with autonomous delivery vehicle 106 can be actuated to pierce a membrane associated with an inflated device such that the package and portion of packaging material can drop into package receptacle 420.

FIGS. 5A-5C respectively depict an example tether configured to couple packaging material and a deliverable item to an autonomous delivery vehicle according to example embodiments of the present disclosure. More particularly, FIGS. 5A-5C respectively depict an example deliverable item 500 and associated portion of packaging material 502 generally surrounding and enclosing the deliverable item 500. Although the deliverable item depicted in FIGS. 5A-5C corresponds to a single package, deliverable item 500 can alternatively correspond to multiple packages and/or letters or other payloads. In some implementations, packaging material 502 can correspond to a substantially flexible material such as a net, bag or the like that can be attached to or integral with packaging of the deliverable item(s) 500. For instance, packaging material 502 such as a net can be designed to hold one or more packages and/or one or more letters all going to the same target delivery location (e.g., an address associated with one or more end recipients). Each portion of packaging material 502 can be formed to include a surface opening and void in which an inflatable device 506a-506c can temporarily secure the package for delivery.

The tether depicted in FIGS. 5A-5C can be or can otherwise include an encoded datasource in the form of NFC chip 504 and an inflatable device 506a-506c (e.g., an inflatable bladder, inflatable balloon, etc.). The inflatable device 506a-506c can be inflated before an autonomous delivery vehicle 508 is launched for travel to a target delivery location to provide lift support for the deliverable item(s) 500. In some implementations, for instance when the inflatable device 506a-506c is positioned above the main body of the autonomous delivery vehicle 508, the packaging material 502 and deliverable item(s) 500 provided therein can be supported below the main body of the autonomous delivery vehicle 508 such that upward lift provided by the inflatable device 506a-506c generally opposes a gravitational pull exerted on the autonomous delivery vehicle 508 due to the deliverable item 500 and packaging material 502. When the shape of the main body of each autonomous delivery vehicle 508 is formed with a C-shaped groove, hole or other opening, such opening(s) can be configured to be positioned relative to a rail (e.g., a first rail, a charging rail) and/or spike (e.g., a launching spike, a landing spike, etc.) associated with a launch system of an autonomous launch vehicle. Such opening(s) can also be configured to receive the inflatable tether as depicted in FIG. 5B. In some implementations, the autonomous delivery vehicle 508 depicted in FIGS. 5A-5C can correspond to autonomous delivery vehicle 106 of FIGS. 1, 3, and 4.

FIG. 5A depicts inflatable device 506a before inflation. Before launch, the portion of packaging material 502 and tether (containing NFC chip 504 and inflatable device 506a) can be caught up in the torus shape of autonomous delivery vehicle 508 as the inflatable device 506b is inflated and the deliverable item 500 and portion of packaging material 502 is lifted, as depicted in FIG. 5B. After autonomous delivery vehicle 508 travels to a specific target location 510 and lowers that portion of packaging material 502 and corresponding deliverable item 500 to or near a ground surface defining the specific target location 510, the inflatable device 506c can be deflated as illustrated in FIG. 5C.

Figure 6:
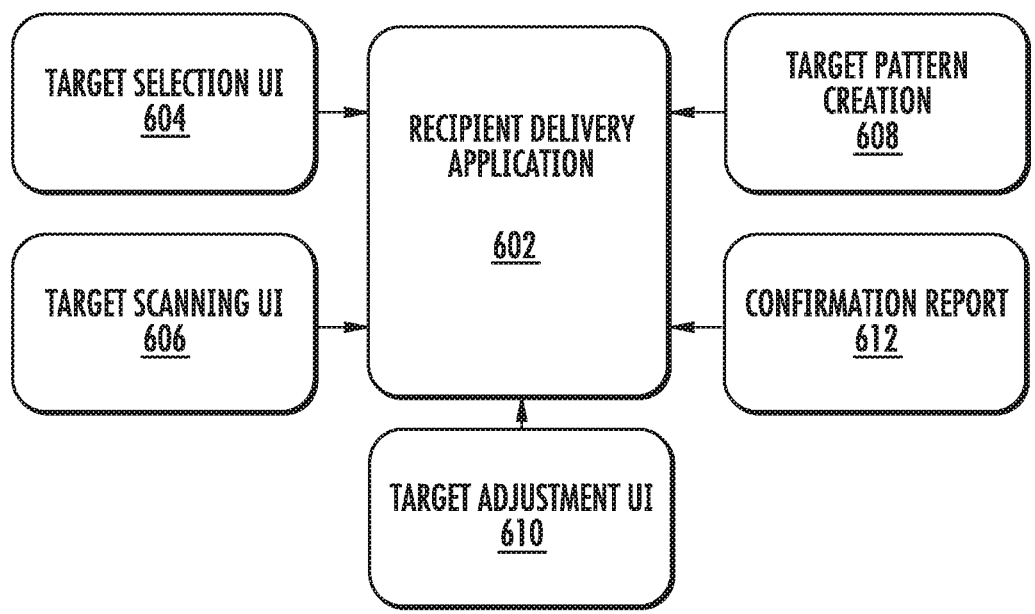
FIG. 6 provides a block diagram of a recipient delivery application according to example embodiments of the present disclosure.

FIG. 6 provides a block diagram of a recipient delivery application 602 according to example embodiments of the present disclosure. Recipient delivery application 602 can be configured, for example, for execution on a user computing device associated with one or more end recipients (e.g., one or more individuals, a business, etc.).

In some implementations, a computing system including one or more computing devices operating the recipient delivery application 602 can execute a target selection user interface 604. The target selection user interface 604 can allow a recipient to interact with a three-dimensional (3D) representation (e.g., a 3D model) or a two-dimensional (2D) representation (e.g., an image such as a street view image, panoramic image, etc.) of a geographic structure of an area to mark within the 3D or 2D representation a target delivery location for deliverable items to the recipient. For example, a marked location can correspond to a general area such as a particular side of a building, a door associated with a building, a ground surface near a building or other area, etc.

Figure 7A:
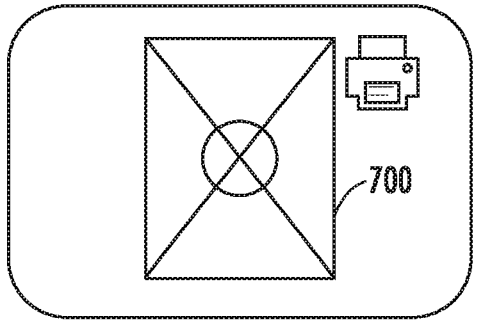
FIGS. 7A-7D respectively depict example user interfaces for a recipient delivery application according to example embodiments of the present disclosure.
Figure 7B:
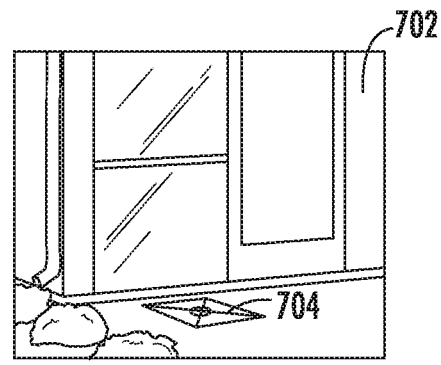

In other implementations, a computing system including one or more computing devices operating the recipient delivery application 602 can execute a target scanning user interface 606. For example, execution of the target scanning user interface 606 can provide instructions for printing a target symbol. FIG. 7A depicts an example target symbol 700 that can be printed in accordance with target scanning user interface 606. FIG. 7B depicts an image 702 that depicts a visual marker 704 that marks a target delivery location associated with a designated end recipient. The visual marker 704 depicted in the obtained image 702 comprises the target symbol 700 printed and placed at the target delivery location.

Figure 7C:
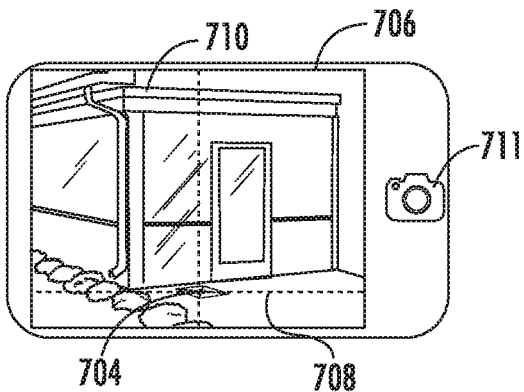
Figure 7D:
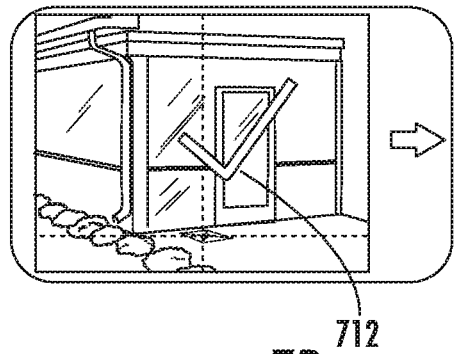

In some implementations, obtaining an image within a recipient delivery application 602 (e.g., within target selection user interface 604 or target scanning user interface 606) can more particularly include providing for display on a display device associated with a user computing device a view 706 as currently seen from an image sensor associated with the user computing device, as depicted in FIG. 7C. A visual indication 708 (e.g., a colored symbol such as green crosshairs or a specific graphic) overlaid on the view 706 can be provided when the view 706 includes the visual marker 704 in a predetermined alignment. For instance, such visual indication 708 can be provided when the entirety of the visual marker 704 is included within the view 706. Alternatively, such visual indication 708 can be provided when a predetermined amount of an associated structure 710 surrounding the visual marker 704 is included within the view 706. Alternatively, such visual indication 708 can be provided when the visual marker 704 is positioned in an accessible location for an autonomous delivery vehicle and/or in a location that includes a predetermined amount of overhead clearance (e.g., 1.5 m) for covering the target delivery location. A selectable button 711 (in the form of camera icon as shown in FIG. 7C or other interface element) can also be provided within the user interface for capturing an image corresponding to the view 706 upon selection of selectable button 711 by a user of the recipient delivery application 602. In some implementations, a computing device executing a recipient delivery application 602 can also provide instructions for displaying a completion indicator 712 on a display device indicating that an image has successfully been captured. For example, as depicted in FIG. 7D, a completion indicator 712 can correspond to a graphic such as the illustrated check mark provided over the view 706, although text-based, other graphic, or other visual indicators may additionally or alternatively be used.

Figure 8A:
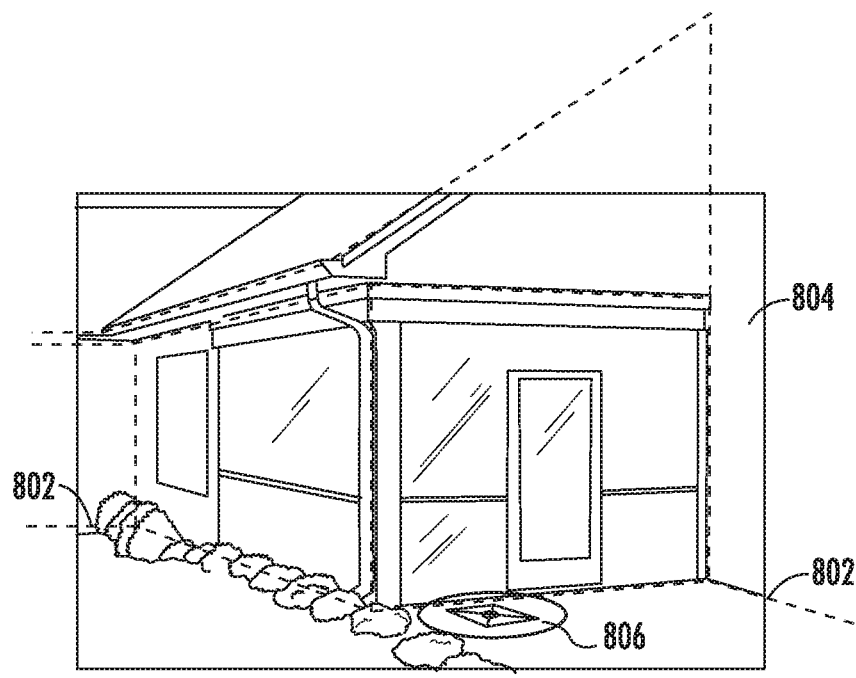
FIGS. 8A-8C depict example aspects associated with a recipient delivery application according to example embodiments of the present disclosure.
Figure 8B:
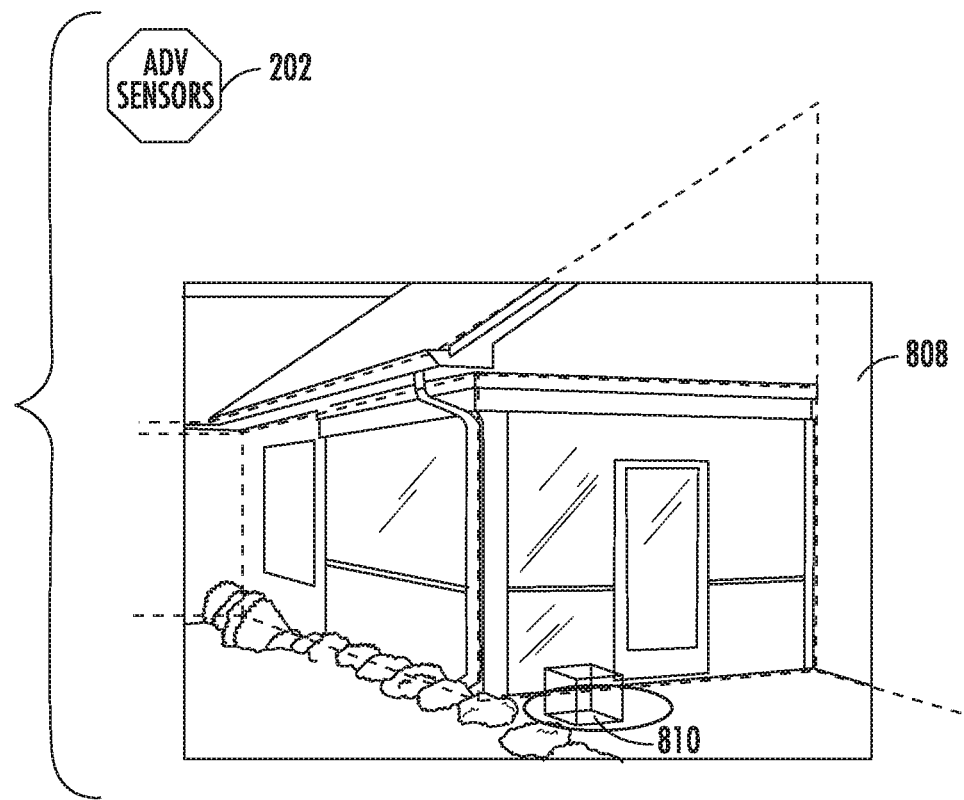

Referring again to FIG. 6 and also with reference to FIGS. 8A and 8B, in some implementations, a recipient delivery application 602 can include one or more target pattern creation features 608. For example, a computing device executing the recipient delivery application 602 can create a localized target pattern 802 (e.g., a two-dimensional pattern, a three-dimensional pattern) for the target delivery location based at least in part on an image 804 (e.g., an image captured using target selection user interface 604 or target scanning user interface 606). For example, a three-dimensional representation can correspond to a three-dimensional model generated from the image 804 or other delivery localization data. More particularly, a localized target pattern can include one or more lines, polygons, or other 2D or 3D shapes, such as the dotted lines depicted in the localized target pattern 802 of FIG. 8A that represents a unique pattern of high contrast edges and spacing of various structural components (walls, doors, windows, etc.) around a target delivery location 806. In some implementations, a localized target pattern 802 can additionally or alternatively include some or all of an image 804.

After creating a localized target pattern 802 as depicted in FIG. 8A, such data can be configured to guide an autonomous delivery vehicle 106 to a specific vicinity of the target delivery location 806, where an autonomous delivery vehicle 106 can deliver the deliverable items 810 identified in the delivery database. The localized target pattern 802 can be configured to guide the autonomous delivery vehicle to a specific vicinity of the target delivery location 806 by analyzing sensor data from sensors (e.g., camera, RADAR, LIDAR, or other sensors within a sensor system 202 such as depicted in FIG. 3) associated with the autonomous delivery vehicle 106 and matching a unique pattern of edges and spacing of structural components around the target delivery location 806. Such sensor data can provide two-dimensional and/or three-dimensional descriptions of the surrounding environment of an autonomous delivery vehicle (as captured in the depiction 808 of FIG. 8B) which can be compared to data within the localized target pattern 802 of FIG. 8A.

Referring again to FIG. 6, in some implementations, a recipient delivery application 602 can include a target adjustment user interface 610. For example, a computing device executing the recipient delivery application 602 can also receive a request to adjust the target delivery location in a delivery database. In response to receiving the request to adjust the target delivery location, the computing device can provide a user interface for display (e.g., similar to one utilized in target selection user interface 604) that includes an adjustable visual marker associated with the target delivery location. The computing device can receive an adjusted target delivery location via the user interface, and store the adjusted target delivery location and associated localized target pattern in the delivery database.

Figure 8C:
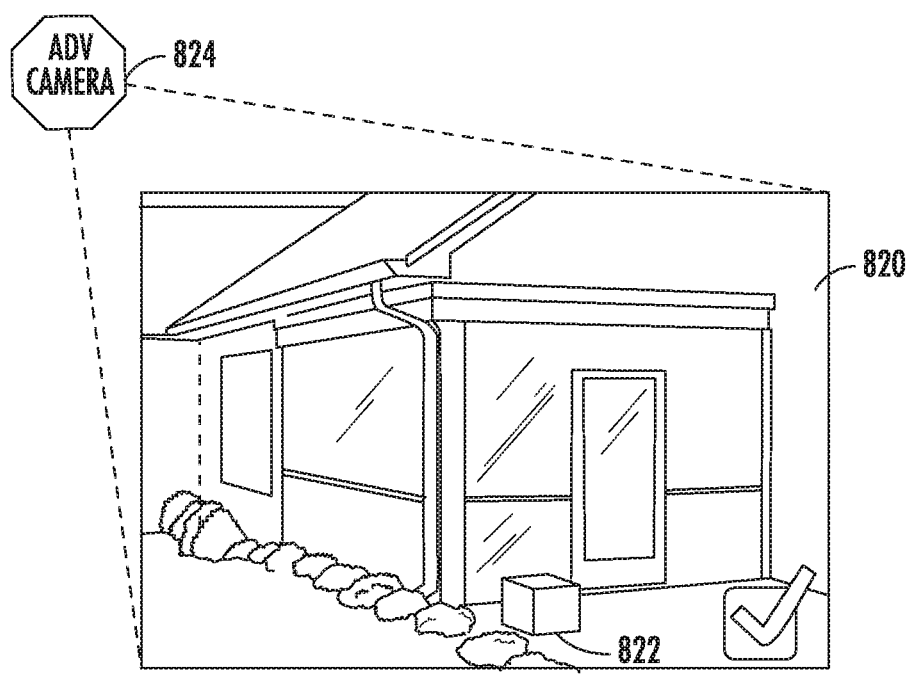

Referring again to FIG. 6 and also with reference to FIG. 8C, in some implementations, a recipient delivery application 602 can include one or more confirmation report features 612. For example, a computing device executing the recipient delivery application 602 can also receive (e.g., via an SMS message, email message, phone service message, etc.) a confirmation report of delivery of a deliverable item by an autonomous delivery vehicle 106 to the target delivery location. In some implementations, the confirmation report can include an image 820 as depicted in FIG. 8C. Image 820 can include a visual confirmation of a deliverable item 822 at the target delivery location after delivery by an autonomous delivery vehicle. Such image 820 of the deliverable item 822 can have been obtained by an image sensor 824 (e.g., a camera) provided within the autonomous delivery vehicle 106.

Figure 9:
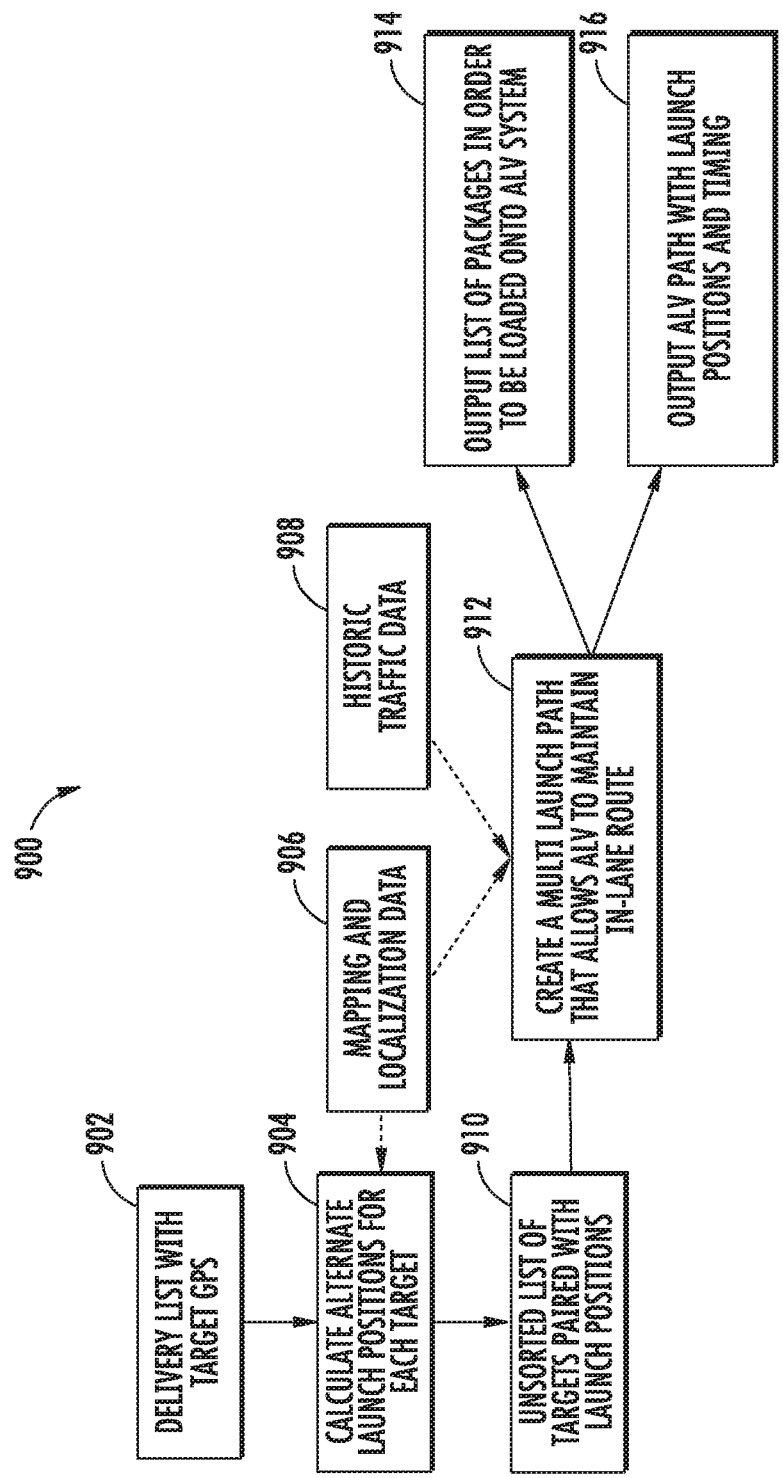
FIG. 9 depicts a block diagram of an example method of determining launch positions according to example embodiments of the present disclosure.

Referring now to FIG. 9, an example method 900 of determining launch positions according to example embodiments of the present disclosure is illustrated. At 902, a computing system including one or more computing devices can receive a plurality of target delivery locations for a plurality of respective deliverable items. In some implementations, the delivery list received at 902 can include one or more geographic identifiers (e.g., GPS coordinates) for each target delivery location.

At 904, the computing system can calculate one or more different potential launch positions for each target delivery location. More particularly, in some implementations, a computing system can determine mapping and localization data at 906. The mapping and localization data 906 can be associated with a general geographic region including the plurality of target delivery locations identified within the delivery list received at 902. Mapping and localization data 906 can include, for example, map data 234 such as described in FIG. 3. Additionally or alternatively, a computing system can determine historic traffic data and/or current traffic data at 908. The historic traffic data and/or current traffic data 908 can be associated with a general geographic region including the plurality of target delivery locations identified within the delivery list received at 902. Such mapping and localization data 906 and/or historic traffic data and/or current traffic data 908 can be used at least in part for calculating the one or more different potential launch positions for each target delivery location at 904.

At 910, a computing system can determine a selected launch position from the one or more different potential launch positions calculated at 904 for pairing with each target delivery location. The list of targets paired with launch positions determined at 910 can be unsorted as far as a particular order of delivery.

At 912, the computing system can generate a launch path for launching a plurality of autonomous delivery vehicles, each autonomous delivery vehicle coupled with one or more respective deliverable items. The launch path generated at 912 can include the selected launch positions paired with each target delivery location identified at 910, but in a sorted order that seeks to generally reduce total delivery time and/or distance when feasible. In some implementations, the launch path generated at 912 can be determined in part based on the mapping and localization data 906 and/or the historic/current traffic data 908. In some implementations, the launch path generated at 912 can further include a launch time associated with each selected launch position for launching the plurality of autonomous delivery vehicles. In some implementations, the launch path generated at 912 is configured for traversal by an autonomous launch vehicle that travels the launch path for one or more consecutive iterations while launching the plurality of autonomous delivery vehicles. In some implementations, the launch path generated at 912 is configured for traversal by the autonomous launch vehicle until the plurality of autonomous delivery vehicles returns to the autonomous launch vehicle after transporting the respective deliverable items to their corresponding target delivery locations.

Still further, the computing system can provide an output related to the launch path generated at 912 for use by an autonomous delivery application. For example, at 914, a computing system can provide an ordered list of deliverable items for loading onto the autonomous launch vehicle. The ordered list provided as output at 914 can be determined based on the launch path generated at 912. Additionally or alternatively, at 916, a computing system can output the launch path for the autonomous launch vehicle including launch positions and launch times for launching the plurality of autonomous delivery vehicles while the autonomous launch vehicle traverses the launch path. Still further steps associated with a method of determining launch positions for a plurality of autonomous delivery vehicles can include various applications of the output related to the launch path for use by an autonomous delivery application, as discussed with further reference to FIG. 10.

Figure 10:
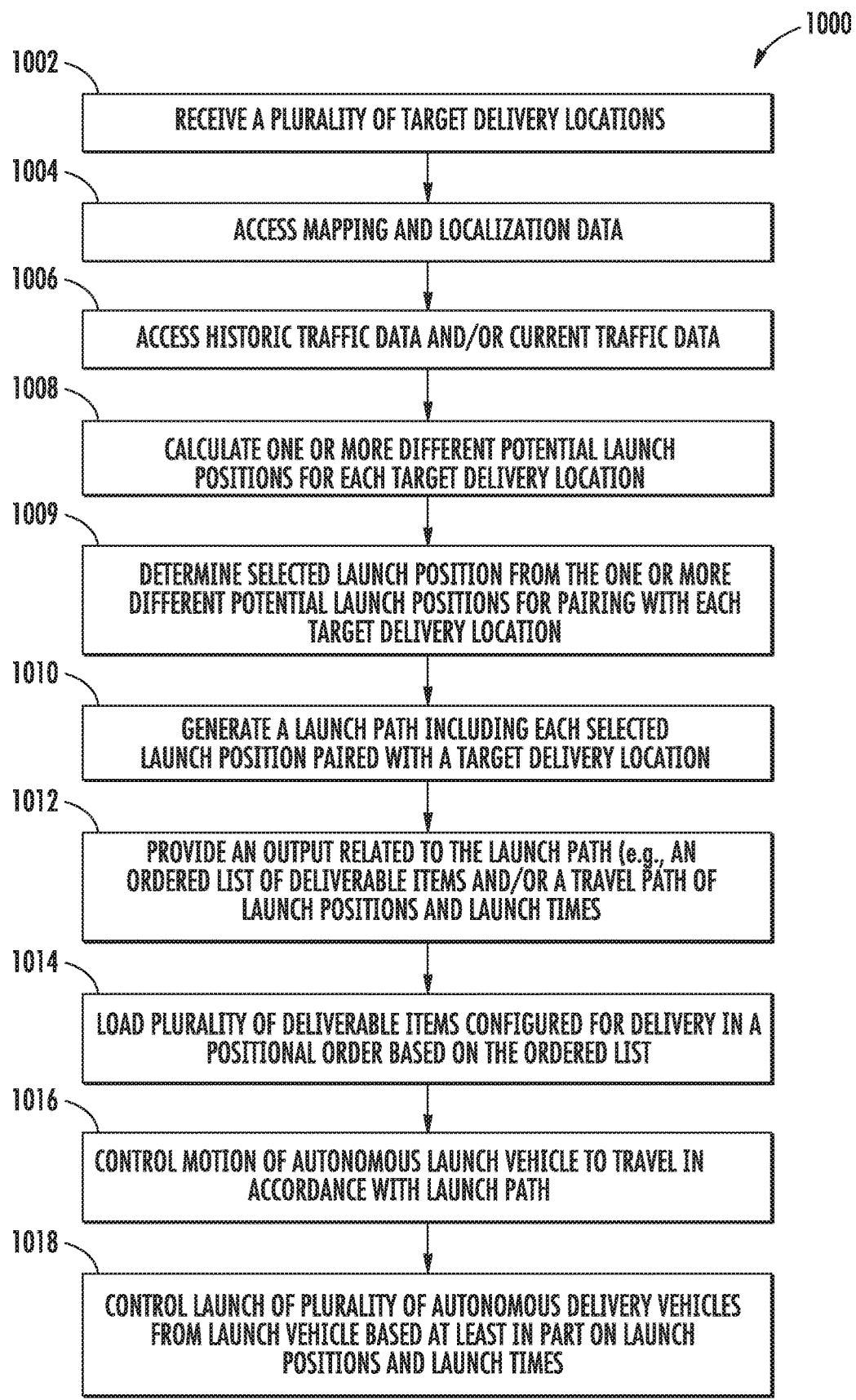
FIG. 10 depicts a flowchart diagram of a method for determining a launch path according to example aspects of the present disclosure.

FIG. 10 depicts a flowchart diagram of a method 1000 for determining a launch path according to example aspects of the present disclosure. One or more portion(s) of the method 1000 can be implemented by one or more computing devices such as, for example, computing device(s) within vehicle computing system 232 of FIG. 3, vehicle computing system 1210 of FIG. 12, and/or operations computing system 1230 of FIG. 12. Moreover, one or more portion(s) of the method 1000 can be implemented as an algorithm on the hardware components of the device(s) described herein (e.g., as in FIGS. 3 and 12).

At 1002, one or more computing devices within a computing system can receive a plurality of target delivery locations for a plurality of respective deliverable items, such as also depicted at 902 in FIG. 9.

At 1004, one or more computing devices within a computing system can access mapping and localization data, such as also depicted at 906 in FIG. 9.

At 1006, one or more computing devices within a computing system can access historic traffic data and/or current traffic data, such as also depicted at 908 in FIG. 9.

At 1008, one or more computing devices within a computing system can calculate one or more different potential launch positions for each target delivery location, such as also depicted at 904 in FIG. 9.

At 1009, one or more computing devices within a computing system can determine a selected launch position from the one or more different potential launch positions calculated at 1008 for pairing with each target delivery location.

At 1010, one or more computing devices within a computing system can generate a launch path including each selected launch position paired with a target delivery location, such as also depicted at 912 in FIG. 9. The launch path generated at 1010 can be configured for launching a plurality of autonomous delivery vehicles, each autonomous delivery vehicle coupled with one or more respective deliverable items. The launch path generated at 1010 can include each selected launch position determined at 1009 paired with a target delivery location from the delivery list received at 1002. In some implementations, the launch path generated at 1010 can additionally or alternatively include a launch time associated with each selected launch position for launching the plurality of autonomous delivery vehicles. In some implementations, the launch path generated at 1010 is configured for traversal by an autonomous launch vehicle that travels the launch path for multiple iterations while launching a plurality of autonomous delivery vehicles. In some implementations, the launch path generated at 1010 is configured for traversal by the autonomous launch vehicle until the plurality of autonomous delivery vehicles return to the autonomous launch vehicle after transporting the respective deliverable items to their corresponding target delivery locations.

At 1012, one or more computing devices within a computing system can provide an output related to the launch path generated at 1010. The output can be provided at 1012 to an autonomous launch vehicle that carries the plurality of autonomous delivery vehicles. For example, the computing system can provide an ordered list of deliverable items, such as depicted at 914 in FIG. 9 and/or output the launch path generated at 1010 including launch positions and/or launch times for an autonomous launch vehicle to travel, such as depicted at 916 in FIG. 9. An ordered list of deliverable items for loading onto an autonomous launch vehicle can be determined based at least in part on the launch path.

At 1014, one or more computing devices within a computing system can load a plurality of deliverable items configured for delivery in a positional order based on the ordered list provided at 1012.

At 1016, one or more computing devices within a computing system can control motion of the autonomous launch vehicle to travel in accordance with the launch path (e.g., the launch path generated at 1010).

At 1018, one or more computing devices within a computing system can control launch of the plurality of autonomous delivery vehicles from the autonomous launch vehicle based at least in part on the launch positions and launch times (e.g., launch paths and launch times determined as part of travel paths in the output provided at 1012).

Figure 11:
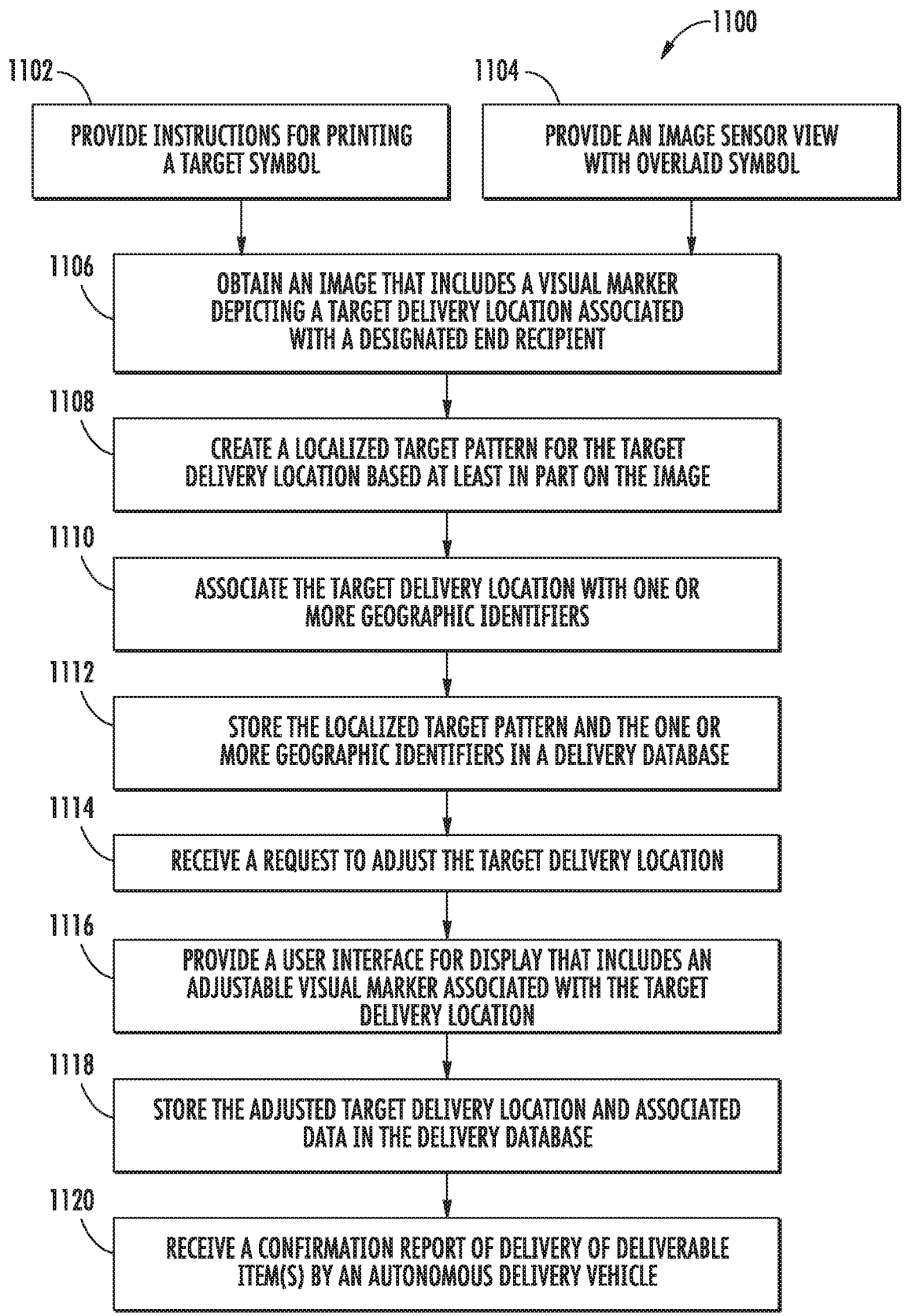
FIG. 11 depicts a flowchart diagram of a method for coordinating recipient delivery locations for an end recipient according to example aspects of the present disclosure.

FIG. 11 depicts a flowchart diagram of a method 1100 for coordinating recipient delivery locations for an end recipient according to example aspects of the present disclosure. One or more portion(s) of the method 1100 can be implemented by one or more computing devices such as, for example, computing device(s) within user computing system 1240 of FIG. 12, which can be configured to execute a recipient delivery application such as described with reference to FIG. 6.

At 1102, one or more computing devices within a computing system can provide instructions for printing a target symbol, such as target symbol 700 depicted in FIG. 7A and further described with reference to target scanning user interface 606.

At 1104, one or more computing devices within a computing system can provide an image sensor view with one or more overlaid symbols representing a target symbol, such as described with reference to target selection user interface 604. In some implementations, the image sensor view provided at 1104 can correspond to a view as currently seen from an image sensor associated with a user computing device. In some implementations, a visual indication can be overlaid within the image sensor view provided at 1104 when the view includes the visual marker in a predetermined alignment.

At 1106, one or more computing devices within a computing system can obtain an image that includes a visual marker depicting a target delivery location associated with a designated end recipient. When method 1100 includes step 1102, the visual marker included within the image obtained at 1106 can comprise the target symbol printed and placed at the target delivery location. In some implementations, a computing system can provide instructions for display on a display device indicating that an image has successfully been captured within step 1106.

At 1108, one or more computing devices within a computing system can create a localized target pattern based at least in part on the image obtained at 1106, such as described with reference to target pattern creation feature 608 of FIG. 6. In some implementations, the localized target pattern created at 1108 can include a two-dimensional representation. In some implementations, the localized target pattern created at 1108 can include a three-dimensional representation (e.g., a three-dimensional model). The localized target pattern created at 1108 can be configured to guide the autonomous delivery vehicle to a specific vicinity of the target delivery location by analyzing sensor data from a sensor system included in the autonomous delivery vehicle relative to the localized target pattern.

At 1110, one or more computing devices within a computing system can associate the target delivery location with one or more geographic identifiers. Example geographic identifiers can include but are not limited to GPS coordinates, street address, and/or other suitable identifiers. The one or more geographic identifiers associated at 1110 are configured to guide an autonomous delivery vehicle to a general vicinity of the target delivery location, whereas the localized target pattern created at 1108 is configured to guide the autonomous delivery vehicle to a specific vicinity of the target delivery location where the autonomous delivery vehicle can deliver the deliverable items identified in the delivery database.

At 1112, one or more computing devices within a computing system can store the localized target pattern created at 1108 and the one or more geographic identifiers associated with the target delivery location at 1110 in a delivery database. In some implementations, the delivery database further includes a plurality of end recipient profiles including an end recipient profile associated with each designated end recipient for one or more deliverable items.

At 1114, one or more computing devices within a computing system can receive a request to adjust the target delivery location, such as described with reference to target adjustment user interface 610 of FIG. 6.

At 1116, one or more computing devices within a computing system can provide a user interface for display on a display device of a user computing system that includes an adjustable visual marker associated with the target delivery location.

At 1118, one or more computing devices within a computing system can store the adjusted target delivery location established via the user interface provided at 1116 and associated data in the delivery database (e.g., within an end recipient profile associated with a designated end recipient associated with the target delivery location).

At 1120, one or more computing devices within a computing system can receive a confirmation report of delivery of deliverable items by an autonomous delivery vehicle, such as described with reference to confirmation report feature 612 of FIG. 6. In some implementations, the confirmation report received at 1120 can include an image of a deliverable item at the target delivery location after delivery by an autonomous delivery vehicle. In some implementations, the confirmation report received at 1120 can be provided to an end recipient identified by an end recipient profile within the delivery database.

Figure 12:
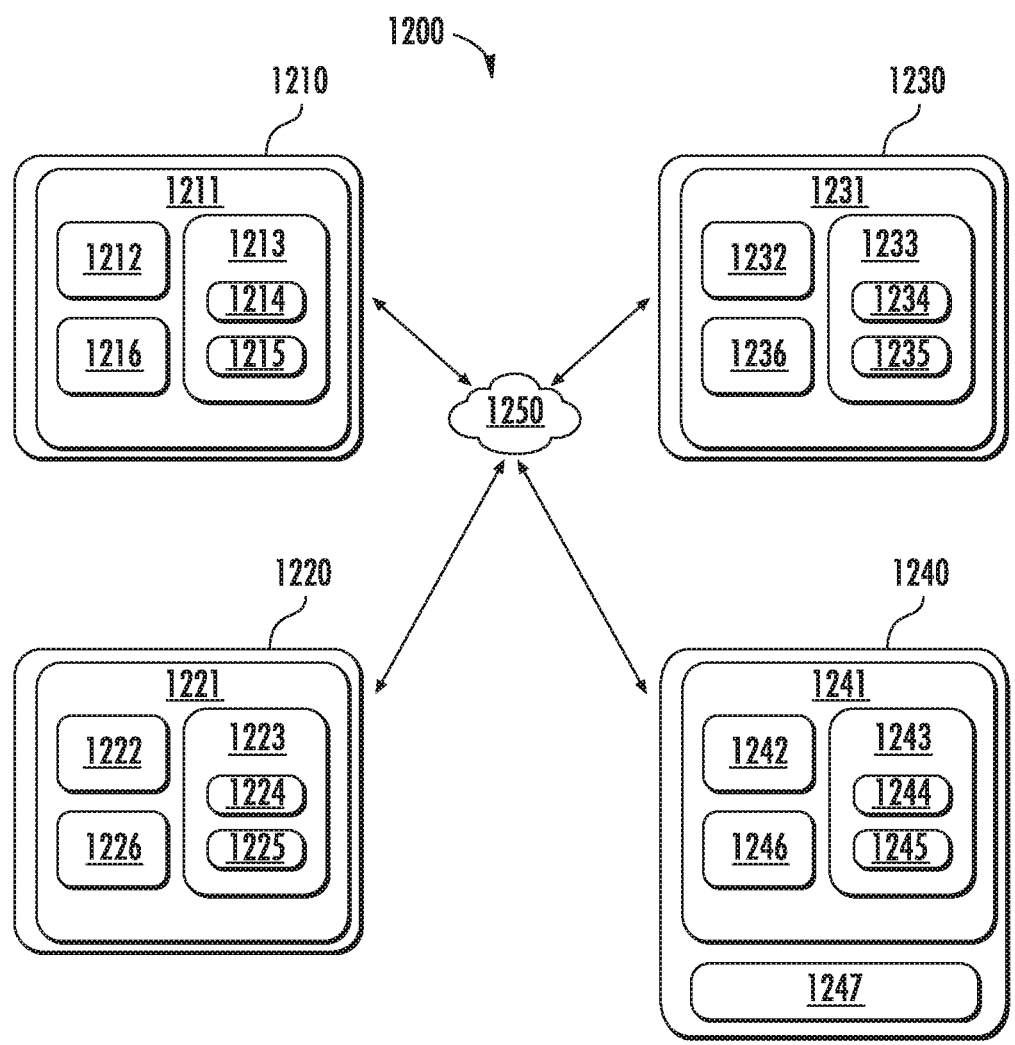
FIG. 12 provides a block diagram of example system components according to example embodiments of the present disclosure.

FIG. 12 provides a block diagram of an example computing system 1200 according to example embodiments of the present disclosure. Computing system 1200 can include a vehicle computing system 1210 associated with an autonomous launch vehicle, a computing system 1220 associated with an autonomous delivery vehicle, an operations computing system 1230 associated with an entity for providing a delivery service, and/or a user computing system 1240 associated with one or more designated end users/recipients of a delivery service. One or more of the vehicle computing system 1210, the computing system 1220, the operations computing system 1230 and the user computing system 1240 can be communicatively coupled over a network 1250.

The vehicle computing system 1210 associated with an autonomous launch vehicle can correspond in some examples to vehicle computing system 232 associated with autonomous launch vehicle 102 as described with reference to FIG. 3. Vehicle computing system 1210 can include one or more distinct physical computing devices 1211 that respectively include one or more processors 1212 and at least one memory 1213. The one or more processors 1212 can be any suitable processing device (e.g., a processor core, a microprocessor, an ASIC, a FPGA, a CPU, a GPU, a controller, a microcontroller, etc.) and can be one processor or a plurality of processors that are operatively connected. The memory 1213 can include one or more non-transitory computer-readable storage mediums, such as RAM, ROM, EEPROM, EPROM, flash memory devices, magnetic disks, etc., and combinations thereof. The memory 1213 can store data 1214 and instructions 1215 which are executed by the processor 1212 to cause vehicle computing system 1210 to perform operations. The instructions 1215 can be software written in any suitable programming language or can be implemented in hardware. Additionally, or alternatively, the instructions 1215 can be executed in logically and/or virtually separate threads on processor(s) 1212. For example, the memory 1213 can store instructions 1215 that when executed by the one or more processors 1212 cause the one or more processors 1212 to perform any of the operations and/or functions described herein, including, for example, operations 1002-1018 of FIG. 10. Vehicle computing system 1210 can also include a network interface 1216 used to communicate with one or more systems or devices, including systems or devices that are remotely located from the vehicle computing system 1210. The network interface 1216 can include any circuits, components, software, etc. for communicating with one or more networks (e.g., network 1250). In some implementations, the network interface 1216 can include, for example, one or more of a communications controller, receiver, transceiver, transmitter, port, conductors, software, and/or hardware for communicating data.

The computing system 1220 associated with an autonomous delivery vehicle can correspond in some examples to computing system 206 associated with autonomous delivery vehicle 106 as described with reference to FIG. 3. Computing system 1220 can include one or more distinct physical computing devices 1221 that respectively include one or more processors 1222 and at least one memory 1223. The one or more processors 1222 can be any suitable processing device (e.g., a processor core, a microprocessor, an ASIC, a FPGA, a CPU, a GPU, a controller, a microcontroller, etc.) and can be one processor or a plurality of processors that are operatively connected. The memory 1223 can include one or more non-transitory computer-readable storage mediums, such as RAM, ROM, EEPROM, EPROM, flash memory devices, magnetic disks, etc., and combinations thereof. The memory 1223 can store data 1224 and instructions 1225 which are executed by the processor 1222 to cause computing system 1220 to perform operations. The instructions 1225 can be software written in any suitable programming language or can be implemented in hardware. Additionally, or alternatively, the instructions 1225 can be executed in logically and/or virtually separate threads on processor(s) 1222. For example, the memory 1223 can store instructions 1225 that when executed by the one or more processors 1222 cause the one or more processors 1222 to perform any of the operations and/or functions described herein, for example, coordinating travel of an autonomous delivery vehicle to and/or from various locations. Computing system 1220 can also include a network interface 1226 used to communicate with one or more systems or devices, including systems or devices that are remotely located from the computing system 1220. The network interface 1226 can include any circuits, components, software, etc. for communicating with one or more networks (e.g., network 1250). In some implementations, the network interface 1226 can include, for example, one or more of a communications controller, receiver, transceiver, transmitter, port, conductors, software, and/or hardware for communicating data.

The operations computing system 1230 associated with an entity for providing a delivery service can correspond, for example, to an operations computing system that can help monitor, communicate with, manage, etc. a fleet of autonomous launch vehicles 102, autonomous delivery vehicles 106, deliverable items (including associated encoded datasources), and the like. Operations computing system 1230 can include one or more distinct physical computing devices 1231 that respectively include one or more processors 1232 and at least one memory 1233. The one or more processors 1232 can be any suitable processing device (e.g., a processor core, a microprocessor, an ASIC, a FPGA, a CPU, a GPU, a controller, a microcontroller, etc.) and can be one processor or a plurality of processors that are operatively connected. The memory 1233 can include one or more non-transitory computer-readable storage mediums, such as RAM, ROM, EEPROM, EPROM, flash memory devices, magnetic disks, etc., and combinations thereof. The memory 1233 can store data 1234 and instructions 1235 which are executed by the processor 1232 to cause operations computing system 1230 to perform operations. The instructions 1235 can be software written in any suitable programming language or can be implemented in hardware. Additionally, or alternatively, the instructions 1235 can be executed in logically and/or virtually separate threads on processor(s) 1232. For example, the memory 1233 can store instructions 1235 that when executed by the one or more processors 1232 cause the one or more processors 1232 to perform any of the operations and/or functions described herein, for example, one or more of operations 1002-1018 of FIG. 10. Operations computing system 1230 can also include a network interface 1236 used to communicate with one or more systems or devices, including systems or devices that are remotely located from the operations computing system 1230. The network interface 1236 can include any circuits, components, software, etc. for communicating with one or more networks (e.g., network 1250). In some implementations, the network interface 1236 can include, for example, one or more of a communications controller, receiver, transceiver, transmitter, port, conductors, software, and/or hardware for communicating data.

The user computing system 1240 associated with one or more designated end users/recipients of a delivery service can include one or more distinct physical computing devices 1241 that respectively include one or more processors 1242 and at least one memory 1243. The one or more processors 1242 can be any suitable processing device (e.g., a processor core, a microprocessor, an ASIC, a FPGA, a CPU, a GPU, a controller, a microcontroller, etc.) and can be one processor or a plurality of processors that are operatively connected. The memory 1243 can include one or more non-transitory computer-readable storage mediums, such as RAM, ROM, EEPROM, EPROM, flash memory devices, magnetic disks, etc., and combinations thereof. The memory 1243 can store data 1244 and instructions 1245 which are executed by the processor 1242 to cause user computing system 1240 to perform operations, such as those associated with the recipient delivery application 602 of FIG. 6. The instructions 1245 can be software written in any suitable programming language or can be implemented in hardware.

Additionally, or alternatively, the instructions 1245 can be executed in logically and/or virtually separate threads on processor(s) 1242. For example, the memory 1243 can store instructions 1245 that when executed by the one or more processors 1242 cause the one or more processors 1242 to perform any of the operations and/or functions described herein, for example, one or more of operations 1102-1120 of FIG. 11. User computing system 1240 can also include a network interface 1246 used to communicate with one or more systems or devices, including systems or devices that are remotely located from the operations computing system 1240. The network interface 1246 can include any circuits, components, software, etc. for communicating with one or more networks (e.g., network 1250). In some implementations, the network interface 1246 can include, for example, one or more of a communications controller, receiver, transceiver, transmitter, port, conductors, software, and/or hardware for communicating data. User computing system 1240 can include a display device 1247 for displaying one or more of the user interfaces, instructions, views, images, etc. obtained in conjunction with the recipient delivery application 602 or other systems, methods or features as described herein.

The network(s) 1250 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 1250 can be accomplished, for instance, via a network interface using any type of protocol, protection scheme, encoding, format, packaging, etc.

FIG. 12 illustrates one example system 1200 that can be used to implement the present disclosure. Other computing systems can be used as well. In addition, components illustrated and/or discussed as being included in one of the computing systems 1210, 1220, 1230, and/or 1240 can instead be included in another of the computing systems 1210, 1220, 1230, and/or 1240. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A launch vehicle, comprising:
a mobility system configured to travel to a general target location;
a launch system, the launch system configured to house a plurality of autonomous delivery vehicles assigned for transporting one or more deliverable items from the general target location to respective specific target delivery locations; and
a computing system configured to:
control launch of the plurality of autonomous delivery vehicles from the launch vehicle at a respective plurality of different predetermined launch positions associated with the general target location, each of the respective plurality of different predetermined launch positions associated with a corresponding launch time, and each of the plurality of autonomous delivery vehicles configured to travel from a launch position of the respective plurality of different predetermined launch positions to a specific target delivery location of the respective specific target delivery locations and from the specific target delivery location to one or more predetermined landing positions;
determine a launch path for travel of the launch vehicle at the general target location, wherein the launch path includes the plurality of different predetermined launch positions and the corresponding launch time associated with each of the plurality of different predetermined launch positions;
dynamically modify at least one launch position of the plurality of different predetermined launch positions to generate an updated launch position for at least one autonomous delivery vehicle of the plurality of autonomous delivery vehicles, the updated launch position being determined during travel of the launch vehicle; and
control launch of the at least one autonomous delivery vehicle at the updated launch position.

2. The launch vehicle of claim 1, wherein the general target location comprises a single predetermined position to which the launch vehicle travels and remains stationary.

3. The launch vehicle of claim 1, wherein the general target location comprises a predetermined launch path along which the launch vehicle travels for multiple iterations.

4. The launch vehicle of claim 1, further comprising a communication system configured to maintain wireless communication with each autonomous delivery vehicle of the plurality of autonomous delivery vehicles after the autonomous delivery vehicle launches from the launch vehicle for travel to a specific target delivery location of the respective target delivery locations and returns from the specific target delivery location to the launch vehicle.

5. The launch vehicle of claim 1, further comprising a sensor system including one or more sensors configured to detect objects within the surrounding environment proximate to the launch vehicle.

6. The launch vehicle of claim 1, further comprising a main body configured to provide support for transporting a deliverable item, the deliverable item having an encoded datasource associated therewith that contains information describing a specific target delivery location.

7. The launch vehicle of claim 1, wherein the computing system is configured to determine a travel path for each of the plurality of autonomous delivery vehicles, each travel path defined from a specific launch position of the plurality of different predetermined launch positions to a specific target delivery location of the respective target delivery locations and then to a specific landing position of the one or more predetermined landing positions.

8. The launch vehicle of claim 1, wherein the computing system is configured to dynamically determine the travel path for each of the plurality of autonomous delivery vehicles, including the specific launch position and the specific landing position, in order to reduce a total distance associated with travel paths for ill of the plurality of autonomous delivery vehicles.

9. The launch vehicle of claim 1, wherein the computing system is configured to dynamically determine the travel path for each of the plurality of autonomous delivery vehicles, including the specific launch position and the specific landing position, based on real-time conditions comprising one or more of traffic, road closures, weather conditions, and delivery times.

10. The launch vehicle of claim 1, wherein:
the launch vehicle comprises an autonomous launch vehicle; and
the computing system is configured to: determine a motion plan through the autonomous launch vehicle's surrounding environment in keeping with the launch path; and to control motion of the autonomous launch vehicle in accordance with the motion plan.

11. The launch vehicle of claim 1, wherein the computing system is configured to dynamically modify the launch path during launch and landing of the plurality of autonomous delivery vehicle to include at least one modified launch path portion.

12. The launch vehicle of claim 11, wherein the computing system is configured to identify a delay in travel of the one or more autonomous delivery vehicles to their respective target delivery locations.

13. The launch vehicle of claim 12, wherein the launch path is dynamically modified to include the at least one modified path portion in response to the delay in travel identified by the computing system.

14. The launch vehicle of claim 1, wherein the computing system is configured to determine an ordered list of deliverable items for loading onto the launch vehicle, wherein determination of the ordered list is based at least in part on the launch path.

15. The launch vehicle of claim 1, wherein the computing system is configured to determine each of the plurality of different predetermined launch positions from a plurality of different potential launch positions.

* * * * *